(12) United States Patent
Kuhlmann et al.

(10) Patent No.: US 9,847,658 B2
(45) Date of Patent: Dec. 19, 2017

(54) SYSTEMS AND METHODS FOR PERFORMING BATTERY MANAGEMENT

(71) Applicants: MERIDIAN DESIGN, INC., Gilbert, TX (US); SHORAI, INC., Morgan Hill, CA (US)

(72) Inventors: Kurt Kuhlmann, Santa Clara, CA (US); David Radford, Los Altos Hills, CA (US); Shawn Higbee, Morgan Hill, CA (US); Dan Matthews, Gilbert, AZ (US)

(73) Assignees: MERIDIAN DESIGN, INC., Gilbert, TX (US); SHORAI, INC., Morgan Hill, CA (US)

( * ) Notice: Subject to any disclaimer, the term of this patent is extended or adjusted under 35 U.S.C. 154(b) by 309 days.

(21) Appl. No.: 14/587,778

(22) Filed: Dec. 31, 2014

(65) Prior Publication Data

US 2016/0190830 A1 Jun. 30, 2016

(51) Int. Cl.
*H02J 7/00* (2006.01)
*H02J 13/00* (2006.01)

(52) U.S. Cl.
CPC .......... *H02J 7/0026* (2013.01); *H02J 7/0016* (2013.01); *H02J 7/0018* (2013.01); *H02J 7/0091* (2013.01); *H02J 13/0003* (2013.01)

(58) Field of Classification Search
USPC ......................................... 320/118
See application file for complete search history.

(56) References Cited

U.S. PATENT DOCUMENTS

| | | | |
|---|---|---|---|
| 2010/0052615 A1* | 3/2010 | Loncarevic | H02J 7/0016 320/118 |
| 2013/0187611 A1* | 7/2013 | Suzuki | B60L 11/1866 320/118 |

\* cited by examiner

*Primary Examiner* — Robert Grant
(74) *Attorney, Agent, or Firm* — Parsons Behle & Latimer

(57) ABSTRACT

Systems and methods for battery management are disclosed. A system may include an internal control network including multiple node controllers powered by a unique cell or combination of cells of a battery. The node controllers may communicate with each other via a node communication system. Each node controller may be responsible for managing a charge level associated with one or more cells. The one or more devices of the internal control network may enable measurement of environmental factors such as a temperature and a current and voltage applied at the battery. Based on the measured environmental factors, the internal control network may perform an ongoing assessment of the one or more cells of the battery and of an overall battery condition. The internal control network may initiate turning on or off a battery output to prevent over discharge and possible damage to the battery or devices connected to the battery.

10 Claims, 12 Drawing Sheets

BATTERY MANAGEMENT SYSTEM 600

SYSTEMS AND METHODS FOR PERFORMING BATTERY MANAGEMENT

FIELD OF THE DISCLOSURE

The present disclosure pertains to battery management and more particularly to managing an output discharge and a charge state of a battery that includes a multiple cells.

BACKGROUND

A typical battery is made up of individual cells connected in series (or sometimes in parallel) to form a stack, where only a first terminal on one side of the stack and a second terminal on the other side of the stack are available for connection to devices external to the battery. In this configuration, a current flowing into and out of the stack is equal through each cell in the series. Each cell may include metal (e.g. metallic plates) that stores a charge and may have a chemical electrolyte that acts upon the metal to enable increasing or decreasing the charge. A resting voltage potential of each cell, a minimum charge level, and a maximum charge level of each cell may depend on a particular chemistry of the cell. Operating the battery outside of the resting voltage potential, the minimum charge level, and the maximum charge level may diminish cell performance.

Common methods for charging batteries include outputting from a charging device a voltage or charge current according to a charge level of the battery. If the battery is already close to fully charged, a trickle charge might be applied, or if the battery charge is very low and needing to be brought back to a threshold level before applying a full charge, a kind of restorative charge might be applied and during normal charging fast or slow charge profiles depending on the needs of the battery and the wishes of the user might be applied.

Because battery chemistries tend to have needs unique to their physical make up it is most common for charging systems to be configured for one chemistry over others. An example of this is vehicle lead acid battery systems where charge and discharge levels, rate of charge and determination of battery state are largely fixed at lead acid levels and therefore introduction of another battery chemistry can complicate the proper care and maintenance of the battery.

In order to make a high performing system most cost effectively, current vehicle systems are configured to support a single kind of battery chemistry. Though advances in battery chemistry may make new battery types more ideal for particular applications, these systems are unable to adapt to the new battery types. For example, most lead acid batteries have a charge termination (where the battery is fully charged) of around 13.8 volts and a lithium ion polymer based battery might have a charge termination voltage of 12.6 volts. A lithium iron phosphate battery might have a charge termination of 13 volts. Substitution of a battery within a particular system with a battery for which the system was not designed may result in the battery being overcharged and potentially damaged.

As another example, discharge termination is also different for different types of batteries. Most battery chemistries have a low voltage threshold, where current output rolls off considerably, and once the battery has been discharged beyond the threshold, it provides much less current. If the battery continues to discharge battery depletion may occur. In lead acid battery systems this roll off occurs at over ten volts whereas in the lithium based systems this roll off might occur at roughly 12.6 volts.

Over-current or over-capacity discharge can greatly reduce battery life. Preventing over-current or over-capacity discharge by turning off battery output can greatly reduce or prevent damage to the battery. A considerable downside to this is that most vehicle charging systems are inductive and removing the battery from the system while it is charging can create a load dump, causing a large output spike which may damage the charging system and other critical vehicle electronics. An unfortunate side-effect of turning off battery output to prevent over discharge is that vehicle system electronics, even if they remain undamaged, also have their power cut and will no longer be able to operate.

Further, most vehicle systems have their battery connections only at the terminal ends of the battery pack and therefore individual cell charge levels are balanced solely by the similarity of cell behavior (similar cells charge and discharge at a similar rate). However individual cells within a battery may have differences due to manufacturing processes and differing deterioration rates. These differences may cause diverging charge efficiency on cells within the same stack.

For battery stacks with only one pair of terminal connections the decision for terminating charge is traditionally determined for an end voltage (over the entire battery stack) whereby the total of all cell charge levels make up a final charge threshold for the entire stack. If one or more cells accumulate charge from a charging current at a slower rate than its companion cells in the stack, other cells may receive a higher charge level than intended. For instance if a 12 volt lead acid battery has a nominal cell voltage of 2.1 volts and six cells in a stack, where each cell is fully charged at 2.3 volts, then a charging system might charge the battery to 13.8 volts (6 volts*2.3 volts). If one cell in the stack has a lower voltage than the rest of the cells then the rest of the cells will have been charged to a higher level than intended. For example, if three cells accepted a charge at a slower rate resulting in charge levels of 1.8 volts on average, then the other three cells will have charged to an average of 2.8 volts each (3 cells*1.8 volts+3 cells*2.8 volts=13.8V). Hence, three cells may be overcharged and three cells may be undercharged. When one or more cells does not charge with the same efficiency as the other cells then, after repeated discharge and charge cycles, a charge imbalance may become amplified and significant. This may result in one or more cells becoming charged over its rated level or discharged below its rated level, thereby damaging the cell or its companion cells and diminishing the overall stack efficiency.

Battery manufacturers attempt to make batteries with cells of equal behavior to help minimize cell charge imbalance, but aging of the electrolyte and metal panels, damage through heat or cold, and/or over and under charging can alter cell behavior over time resulting in unbalanced charging. Cells age differently over time and since current charging systems apply current equally through all the cells in the series stack, the battery usefulness may be decreased in accordance with the output of the weakest cell. Other drawbacks and disadvantages of current systems and methods also exist.

SUMMARY

Accordingly, disclosed are systems and methods that solve or mitigate the above-noted, and other, deficiencies and drawbacks of existing systems. For example, disclosed are systems and methods for performing battery management within a battery. The systems may include an internal control network including multiple control nodes powered by a unique cell or combination of cells of the battery. The control nodes may communicate with each other over a capacitively isolated signal path. Each control node may be responsible for managing a charge level associated with one or more cells. The one or more devices of the internal control network may enable measuring of environmental factors such as a temperature and a current and voltage applied at the battery. Based on the measured environmental factors, the internal control network may perform an ongoing assessment of the one or more cells of the battery and of an overall battery condition. The internal control network may initiate turning on or off a battery output to prevent over discharge and possible damage to the battery or devices connected to the battery.

In an embodiment, a battery management system includes a plurality of cells coupled in series between a positive terminal and a negative terminal. The battery management system further includes a first node controller electrically coupled to a first set of node subsystems, the first node controller powered by a first cell or set of cells of the plurality of cells. The battery management system also includes a second node controller electrically coupled to a second set of node subsystems, the second node controller powered by a second cell or set of cells of the plurality of cells. The second set of cells differs from the first set of cells.

In another embodiment, a battery management method for charging a first type of battery at a charger configured for a second type of battery includes calculating a battery charge level. The method further includes determining based on the battery charge level whether a charging input is to be decreased. The charging input includes an externally applied voltage difference between the first terminal and the second terminal. The method also includes, in response to determining that the charging input is to be decreased, triggering a decrease in the charging input.

In another embodiment, a battery management system for charge balancing includes a first node controller, the first node controller corresponding to a first cell or set of cells of a plurality of cells. The battery management system further includes a second node controller, the second node controller corresponding to a second cell or set of cells of the plurality of cells. The second set of cells differs from the first set of cells. The battery management system also includes a node communication system communicatively coupling the first node controller to the second node controller via a communication signal line.

In another embodiment, a battery management method for cell balancing includes initiating measurement, by a first node controller, of first charge levels associated with each cell of a first set of cells of a battery, the first set of cells coupled to the first node controller. A first total charge level associated with the first set of cells is based on the first charge levels. The method further includes, in response to determining that the first charge levels are unbalanced, reducing a charge level of one or more cells of the first set of cells. The method also includes receiving, at the first node controller, an indication from a second node controller of a second total charge level associated with a second set of cells coupled to the second node controller. The method includes, in response to determining that the first total charge level is not balanced with the second total charge level, simultaneously reducing a charge level of each cell of the first set of cells.

In another embodiment, a battery management system includes a plurality of cells coupled in series between a positive terminal and a negative terminal. The battery management system further includes a transistor coupled in series with the plurality of cells between the positive terminal and the negative terminal.

In another embodiment, a battery management method for enabling low current output includes disabling a first transistor positioned in series with a plurality of cells between a first terminal and a second terminal. The method further includes enabling a second transistor positioned in series with the plurality of cells and in series with a resistor between a first terminal and a second terminal.

In another embodiment, a battery management method for communicating with an external device includes, when a battery is in a charging state, selectively enabling and disabling a transistor positioned in series with one or more cells between terminals of the battery. Selectively enabling and disabling the transistor changes a voltage between the terminals. The method further includes, when the battery is in a state of discharge or in a quiescent state, selectively applying a voltage level to a control input of the transistor to change a resistance of the transistor. Changing a resistance of the transistor changes the voltage between the terminals.

In an embodiment, a battery management method for adapting a charging input includes receiving a charging input associated with a first battery chemistry-type. The charging input includes an externally applied current between the first terminal and the second terminal. The method further includes generating a modified charging input associated with a second battery chemistry-type corresponding to the plurality of cells. The modified charging input includes a current applied to the plurality of cells.

In an embodiment, a battery management method of controlling an output of a battery includes measuring a voltage between terminals of a battery. The method further includes disabling an output current of the terminals when the voltage is below a threshold voltage.

DETAILED DESCRIPTION

Battery Management System (Structure)

Figure 1:
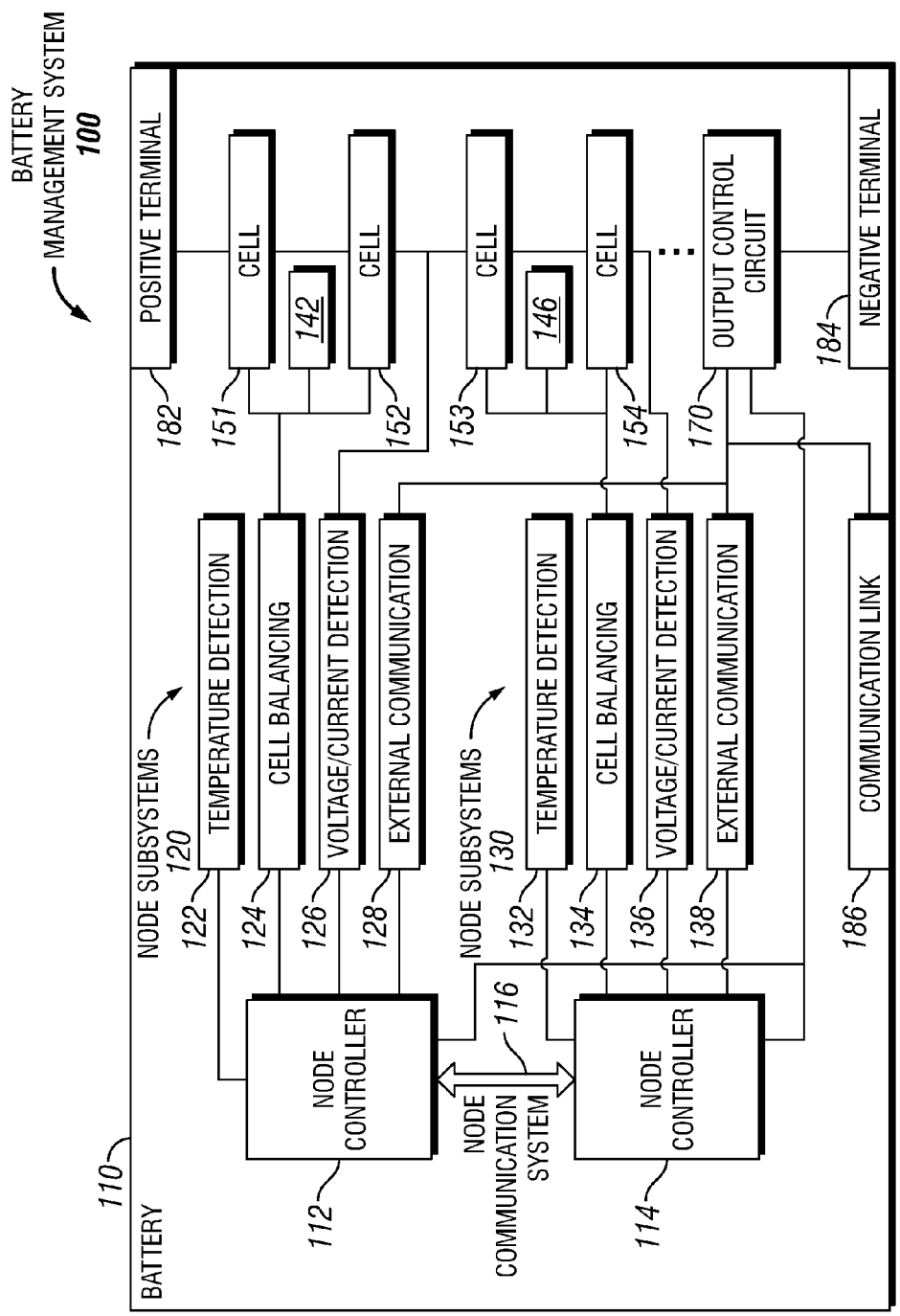
FIG. 1 is a block diagram illustrating an embodiment of a battery management system.

Referring to FIG. 1, a block diagram of an embodiment of a battery management system 100 is depicted. The battery management system 100 may be implemented as part of (or within) a battery 110. For example, the battery management system 100 may perform battery management operations associated with the battery 110. The battery management system 100 may include multiple node controllers 112, 114, multiple sets of node subsystems 120, 130, multiple cells 151-154, an output control circuit 170, a positive terminal 182, and a negative terminal 184. Although FIG. 1 depicts the battery 110 as including two node controllers 112, 114 and two sets of node subsystems 120, 130, in other embodiments, the battery 110 may include more than two or fewer than two node controllers and more than two or fewer than two sets of node subsystems. It may be understood by persons of ordinary skill in the art that the number of node controllers, and the number of node subsystems may be scaled based on a voltage capacity of the battery 110, on a number of cells of the battery 110, on a voltage capacity of individual cells of the battery 110, on an operating voltage requirement of each node controller, on another scaling factor, or combinations thereof.

The node controllers 112, 114 may be implemented as an internal control network and may transmit and receive signals from each of the sets of node subsystems 120, 130. For example, the node controller 112 may control the set of node subsystems 120 by transmitting and receiving signals from the set of node subsystems 120 and the node controller 114 may control the set of node subsystems 130 by transmitting and receiving signals from the set of node subsystems 130.

One or more of the node controllers 112, 114 may include a processing element. Examples of processing elements include a central processing unit (CPU), a digital signal processor (DSP), a Peripheral Interface Controller (PIC), and/or another type of processing element. In an embodiment, the processing element is configured (e.g., hardwired) to perform operations as described herein. In an embodiment, the processing element is general-type processing element and one or more of the node controllers 112, 114 may also include a memory storing instructions that, when executed by the processing element, cause the processing element to perform operations as described herein. For example, the memory may be a non-transitory processor readable medium. Examples of memory include random access memory (RAM), dynamic RAM (DRAM), read-only memory (ROM), solid state memory, magnetoresistive memory, magnetic disk memory devices, compact disc (CD), digital video disc (DVD), and/or another type of digital memory. The operations may include processing, controlling, and/or receiving signals from one or more of the set of node subsystems 120 and the set of node subsystems 130 as described herein. The operations may further include communicating with another node controller and/or an external communication device as described herein.

The set of node subsystems 120 may include a temperature detection subsystem 122, a cell balancing subsystem 124, a voltage/current detection subsystem 126, and an external communication subsystem 128. Likewise, the set of node subsystems 130 may include a temperature detection subsystem 132, a cell balancing subsystem 134, a voltage/current detection subsystem 136, and an external communication subsystem 138. Each node subsystem of the set of node subsystems 120 may be electrically coupled to the node controller 112 such that the node controller 112 may control and receive signals from each of the temperature detection subsystem 122, the cell balancing subsystem 124, the voltage/current detection subsystem 126, and the external communication subsystem 128 and each node subsystem of the set of node subsystems 130 may be electrically coupled to the node controller 114 such that the node controller 114 may control and receive signals from each of the temperature detection subsystem 132, the cell balancing subsystem 134, the voltage/current detection subsystem 136, and the external communication subsystem 138. Other subsystems may also be included.

Although FIG. 1 depicts each of the sets of node subsystems 120, 130 as including similar or the same subsystems, in other embodiments the set of node subsystems 120 may be different (i.e., include different subsystems) than the set of node subsystems 130. To illustrate, in some embodiments, the set of node subsystems 120 may not include one or more of the temperature detection subsystem 122, the cell balancing subsystem 124, the voltage/current detection subsystem 126, and the external communication subsystem 128. Further, in some embodiments, the set of node subsystems 130 may not include one or more of the temperature detection subsystem 132, the cell balancing subsystem 134, the voltage/current detection subsystem 136, and the external communication subsystem 138. In a particular embodiment, the set of node subsystems 120 includes the temperature detection subsystem 122 and the cell balancing subsystem 124, but not the voltage/current detection subsystem 126 or the external communication subsystem 128. In this particular embodiment, the set of node subsystems 130 includes the cell balancing subsystem 134, the voltage/current detection subsystem 136, and the external communication subsystem 138, but not the temperature detection subsystem 132.

The cells 151-154 may be arranged in series or in a stack. For example, a negative terminal of the cell 151 may be coupled to a positive terminal of the cell 152, a negative terminal of the cell 152 may be coupled to a positive terminal of the cell 153, and a negative terminal of the cell 153 may be coupled to a positive terminal of the cell 154. The cell 151 may be coupled to the positive terminal 182 of the battery 110 and the cell 154 may be coupled to the output control circuit 170, where the output control circuit 170 may further be coupled to the negative terminal 184 of the battery 110. Hence, the positive terminal 182, the cells 151-154, the output control circuit 170, and the negative terminal 184 may form a circuit path through the battery 110. As such, the output control circuit 170 may control a current flow through the battery and control a voltage difference between the positive terminal 182 and the negative terminal 184, as described herein.

In an embodiment, heating elements 142, 146 may be positioned between some or each of the cells 151-154. The heating elements 142, 146 may heat the cells 151-154, as described herein, such that the cells 151-154 may be maintained within a recommended temperature range.

Each of the node controllers 112, 114 may be powered by a respective cell or set of cells of the multiple cells 151-154. For example, the node controller 112 may be powered by the cell 151 and the cell 152 and the node controller 114 may be powered by the cell 153 and the cell 154. By powering each of the node controllers 112, 114 with a subset of all the cells 151-154, each of the node controllers 112, 114 may be connected to only enough cells to supply its rated voltage needs. To illustrate, many microcontrollers have an operating voltage of 2V to 3.3V or even 5V. If a cell chemistry of the cells 151-154 is such that a single cell (e.g., the cell 151) can power a single node controller (e.g., the node controller 112) then a respective node controller may be configured at every cell. If voltage levels of two cells (e.g., cell 151 and cell 152) can be added to provide a sufficient voltage supply for one node controller (e.g., the node controller 112) then the arrangement of the battery management system 100 may be as depicted in FIG. 1, with one node controller for every two cells. For example, the node controller 112 may correspond to the cells 151, 152 and the node controller 114 may correspond to the cells 153, 154.

A benefit of using only a subset of the cells 151-154 to supply power to each of the node controllers 112, 114 is that a difference between the supply voltage available to a node and a supply voltage requirement of the node may be smaller as compared to a battery management system that powers node controllers using every cell of the battery. Hence, additional circuitry and resources are not needed to regulate the supply voltage. Further, many microcontrollers have the ability to use their supply voltage as an analog-to-digital reference. In cases where a microcontroller is powered using every cell of the battery, inputs received at the microcontroller may need to be divided or attenuated to be sampled within the supply range of the controller. In this case, a measurement resolution of the input may be reduced and/or an input may be offset as compared to systems that power the microcontrollers with only a subset of cells of the stack as depicted in FIG. 1. Hence, by powering the node controllers 112, 114 with a smaller subset of the cells 151-154 instead of each of the cells 151-154, the node controllers may measure inputs with a greater range (leading to a higher input resolution), thereby generating more accurate calculations.

In an embodiment, the nodes controllers 112, 114 may be configured as master and slave node controllers whereby not every node controller has the same abilities or responsibilities as other node controllers. For example, as described herein, the set of node subsystems 120 controlled by the node controller 112 may be different than the set of node subsystems 130 controlled by the node controller 114. As such, operations such as determining whether each of the cells 151-154 is sufficiently balanced and receiving temperature inputs, as described herein, may be performed by a first node controller (e.g. the node controller 112), while a second node controller (e.g. the node controller 114) may be configured to perform operations such as determining whether to disable an output discharge of the battery 110 and communicating with external devices, as described herein. By dividing battery management operations between the node controllers 112, 114, the battery management system 100 may conserve resources as compared to systems that include only one node controller to perform each operation or systems that perform each operation at each node controller.

The node controllers 112, 114 may form an internal control network by communicating between each other via a node communication system 116. The node communication system 116 may enable transmitting signals between the node controllers 112, 114. As such, each of the node controllers 112, 114 may access node subsystems that are controlled by other nodes. For example, signals or measurements may be transmitted from the set of node subsystems 120 to the node controller 114 via the node controller 112. Likewise, signals or measurements may be transmitted from the set of node subsystems 130 to the node controller 112 via the node controller 114. In embodiments where the sets of node subsystems 120, 130 are different from each other (e.g., a master/slave node controller configuration), each of the node controllers 112, 114 may have access to subsystems coupled to the other node controller. To illustrate, in an embodiment where the set of node subsystems 130 does not include the temperature detection subsystem 132, the node controller 114 may still receive a signal indicating a temperature from the temperature detection subsystem 122 via the node controller 112 and the node communication system 116. An embodiment of the node communication system 116 is further described with reference to FIG. 2.

Each node subsystem of the sets of node subsystems 120, 130 may include circuitry to perform one or more battery management operations. Further, although each node subsystem of the sets of node subsystems 120, 130 are depicted in FIG. 1 as being distinct from each other and distinct from other systems and circuits of the battery management system 100, in other embodiments, the sets of node subsystems 120, 130 may share circuitry between node subsystems and between other circuits of the battery management system 100.

The temperature detection subsystems 122, 132 may detect a temperature at the battery 110. For example, the temperature subsystems 122, 132 may be configured to measure a temperature at one or more of the node controllers 112, 114, at one or more of the cells 151-154, at one or more of the terminals 182, 184, or a combination thereof. The temperature detection subsystems 122, 132 may include an electronic thermometer, a thermistor, another type of temperature measurement device, or a combination thereof. Although FIG. 1 depicts the temperature detection subsystems 122, 132 as being distinct from the node controllers 112, 114, in other embodiments, the temperature detection subsystem 122 may be included as part of the node controller 112 and the temperature detection subsystem 132 may be included as part of the node controller 114.

The cell balancing subsystems 124, 134 may include circuitry to enable performance of cell balancing of cells within the stack as described herein. For example, the circuitry may be configured to draw down a charge level of one or more of the cells 151-154 that have a higher charge level than the other cells. An embodiment of one or more of the cell balancing systems 124, 134, is described further with reference to FIG. 3.

In an embodiment, the cell balancing systems 124, 134 may be coupled to one or more of the heating elements 142, 146. For example, the cell balancing subsystem 124 may be coupled to the heating element 142 and the cell balancing subsystem 134 may be coupled to the heating element 144. As the cell balancing subsystems 124, 134, perform cell balancing, a current or other signal may be applied to one or more of the heating elements 142, 146. In an embodiment, the heating elements 142, 146 include a resistive material that generates heat upon application of an electrical current. For example, the heating elements 142, 146 may include nichrome wire or heating pads. In an embodiment the heating elements include kanthal (FeCrAl), nichrome, cupronickel (CuNi), another type of resistive heating material, or combinations thereof. The heating elements 142, 146 may be wrapped around or placed between the cells such that the heating elements 142, 146 may warm the cells 151-154 to facilitate keeping the cells 151-154 within a recommended temperature range depending on a chemical type of the cells 151-154. Although FIG. 1 depicts the battery management system 100 as including the heating elements 142, 146, in other embodiments, the heating elements 142, 146 may be omitted (for example, if the battery management system 100 does not to perform heating). In an embodiment, the heating elements 142, 146 may be selectively activated based on a determination made by one or more of the node controllers 112, 114.

By using currents generated during cell balancing to power the heating elements 142, 146, the battery management system 100 may make efficient use of the cells during discharges due to cell balancing. Alternatively, the heating elements 142, 146 may be coupled directly to the node controllers 112, 114. For example, in an embodiment, heating of the cells 151-154 may be selectively performed independent of balancing the cells.

The voltage/current detection subsystems 126, 136 may include circuitry configured to detect one or more a voltages and/or currents associated with the battery 110. For example, the voltage may correspond to a voltage difference between the terminals 182, 184, a voltage difference between sets of cells, and a voltage across individual cells. As an example, the voltage/current detection subsystem 126 may be configured to detect a voltage across the cell 151, the cell 152, or both. As another example, the current and voltage subsystem 136 may be configured to measure a voltage difference across the cell 153, the cell 154, or both. In an embodiment, the voltage/current detection subsystems 126, 136 may be configured to selectively measure one or more of the above described voltages.

The voltage/current detection subsystems 126, 136 may be further configured to measure a current through one or more cells of the stack. For example, the voltage/current detection subsystem 126 may selectively measure a current flowing from the cell 152 to the cell 153 and the voltage/current detection subsystem 136 may selectively measure current flowing from the cell 154 to the output control circuit. In other embodiments, the voltage/current detection subsystems 126, 136, may measure currents at other positions along the path between the positive terminal 182 and the negative terminal 184. An embodiment of one or more of the voltage/current detection subsystems 126, 136 is described further with reference to FIG. 4.

In an embodiment, a prior history of the currents and voltages described above may be stored at the voltage/current detection subsystem 126. For example, the voltage/current detection subsystem 126 may store a number of measured currents and/or voltages sampled periodically. As such, the voltage/current detection subsystems 128, 136 may provide a history of prior voltages and/or currents at the terminals 182, 184 and at each of the cells 151-154. In other embodiment, the prior history may be stored at one or more of the node controllers 112, 114, at one or more memory of the battery 110, or at a remote communication device in communication with the battery management system 100, as described herein.

The external communication subsystems 128, 138 may include circuitry configured to enable communication with a remote communication device. For example, one or more of the node controllers 112, 114 may be configured to send data to and receive data from a device external to the battery 110 via one or more of the external communication subsystems 128, 138. Upon receiving data from the battery management system 100, the remote communication device may signal information to a user or accept user input. To illustrate, the remote communication device may indicate fault conditions or battery diagnostics to a user. The remote communication device may further accept user commands, issue commands to the battery management system 100 to control an output of the battery 100, or adjust a charging input to the battery 110. The remote communication device may include a user interface, an external charger system, or both. Embodiments of a remote communication device are further described with reference to FIGS. 5 and 7.

In some embodiments, the battery management system 100 may include a communication link 186 coupled to the external communication subsystems 128, 138. The communication link 186 may include circuitry to enable the external communication subsystems 128, 138 to communicatively couple with the remote communication device. For example, the communication link 186 may include wired or wireless communication interfaces. Examples of wired communication interfaces include a serial pin communication interface, a universal serial bus (USB) interface, etc. Examples of wireless communication interfaces include wireless USB, Bluetooth, Wi-Fi, etc.

Although FIG. 1 depicts the battery management system 100 as including the communication link 186, in other embodiment, the communication link 186 is omitted and the external communication subsystems 128, 138 communicate to the external device via the terminals 182, 184. For example, the external communication subsystems 128, 138 may be coupled to the output control 170 such that the external communication subsystems 128, 138 may control a voltage difference between the terminals 182, 184 as described further herein. Controlling the voltage difference between the terminals may enable the external communication subsystems 128, 138 to place a signal on one of the terminals 182, 184 that may be received by the external device. By communicating with the external device through the terminals 182, 184, the need for additional data lines or radio signal translation circuitry to transmit data regarding a state of the battery 110 is removed. Further, although FIG. 1 depicts the external communication subsystems 128, 138 as being distinct from the output control 170, in some embodiments, the external communications subsystems 128, 138 may be incorporated wholly or in part into the output control 170. For example, one or more of the node controllers 112, 114 may control the output control 170 directly to place a voltage signal between the terminals 182, 184. Embodiments of the external communication subsystems 128, 138 are described further with reference to FIG. 5.

The voltage output control 170 may be positioned in series with the cells 151-154 and between the terminals 182, 184. The output control 170 may be controlled by one or more of the node controllers 112, 114 to selectively alter an impedance between the terminals 182, 184, to alter a voltage difference between the terminals 182, 184, to inhibit an output current of the cells 151-154, to transmit a signal to an external device by fluctuating a voltage and/or impedance between the terminals 182, 184, or combinations thereof. The output control 170 may further be configured to selectively and directionally enable a current surge to pass through the battery 110 after the output current has been disabled in order to protect circuitry associated with a charging device, to protect circuitry associated with a device powered by the battery, or both. An embodiment of an output control 170 is described further with reference to FIG. 4.

Depending on a configuration of the node controllers 112, 114, the battery management system 100 may be configured to perform multiple combinations of operations to manage the battery 110 as described further herein.

Battery Management System (Operations)

The battery management system 100 may selectively operate within one or more operating profiles. Depending on the selected operating profile, different operations, described further herein, may be performed by the battery management system 100. Examples of various operating profiles and methods of determining which operating profile to execute are described further with reference to FIGS. 8-11. For illustrative purposes the operations of the battery management system 100 may be discussed in terms of a vehicle system. For example, a lead acid battery of a vehicle system may be replaced with a Lithium Iron Phosphate battery that includes the battery management system 100. While the example described herein pertains to a vehicle, such as a motorcycle, many other systems including but not limited to vehicle systems are also good candidates for the benefits of the disclosed system and method as well as other systems with other battery types whether or not they are based in a vehicle system.

In one or more operating profiles, the battery management system 100 may receive a charging input from a charger device. The charging input may include a current applied to the positive terminal 182 and passing through the cells 151-154. The charging input may increase a charge level of each cell. In the case of the motorcycle, a charging device used to generate the charging input may be adapted for lead acid type cells, while the cells 151-154 may be lithium iron phosphate (LiFePO4) type cells. A charging profile of lead acid type batteries may be different than a charging profile of lithium iron phosphate type batteries. For example, lead acid type batteries and lithium iron phosphate type batteries may have different maximum recommended charge levels, minimum recommended charge levels, nominal voltages, and stack sizes (numbers of cells within a stack). Table 1 depicts an example of a comparison of a charging profile of lead acid type batteries to lithium iron phosphate type batteries:

TABLE 1

| Battery Charge Voltage Comparison | Lead Acid | LiFePO4 |
|---|---|---|
| Nominal Voltage for 12 V Automotive | 12 V | 12.8 V |
| Stack size * Nominal Cell Voltage | 6 * 2 V | 4 * 3.2 V |
| Maximum charge level | 13.8 | 14.4 |
| 100% charged | 12.7 | 13.6 |
| 80% charged | 12.5 | 13.4 |
| 60% charged | 12.2 | 13.2 |
| 40% charged | 11.9 | 12.8 |
| 20% charged | 11.6 | 12.6 |
| Fully discharged | 11.4 | 10.0 |

Figure 12:
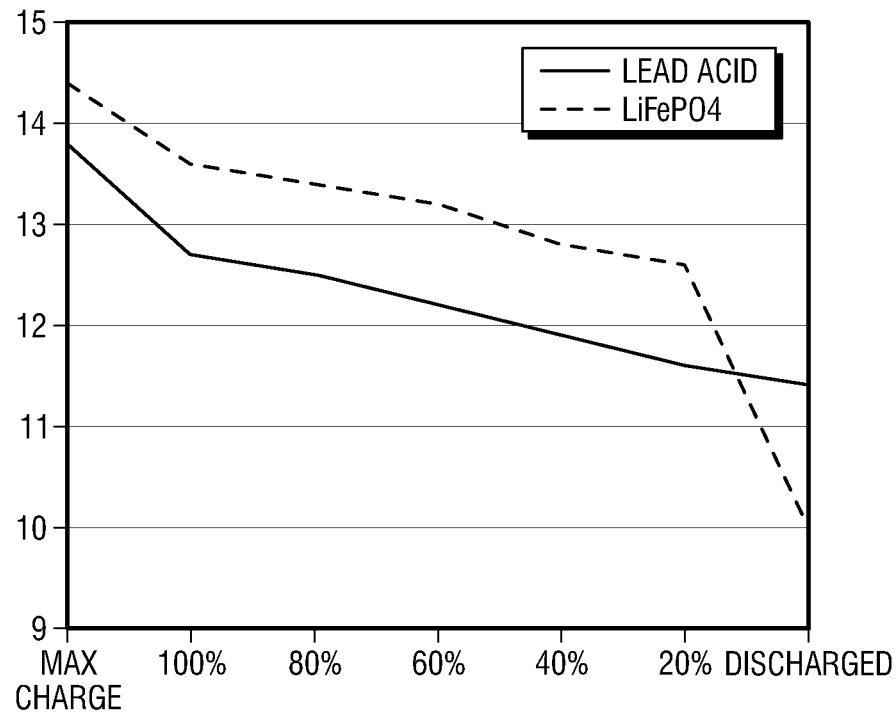
FIG. 12 is a graphical illustration of example charging profiles associated with lead acid type batteries and lithium iron phosphate type batteries.

A graphical representation of the percentage charged values of Table 1 is reflected in FIG. 12. As shown in FIG. 12, voltage levels of a lithium iron phosphate type battery within a range of charge levels are higher than those of lead acid type batteries until about a 15% charge level, when the voltage level of the lithium iron phosphate type battery drops off significantly.

Returning to FIG. 1, the battery may receive the charging current through the cells 151-154 until a voltage of the battery 110 exceeds a predetermined level (e.g., a maximum charge level threshold). The predetermined level may correspond to a particular battery chemistry (e.g., lithium iron phosphate) of the battery 110. The charging device may be configured to terminate the charging current when a second predetermined level is detected by the charging device at the terminals 182, 184. The second predetermined level may be adapted for batteries of a different battery chemistry (e.g., lead acid) than the battery 110. For example, referring to Table 1, the maximum charge level of a lead acid type battery may be 13.8 volts whereas the maximum charge level of a lithium iron phosphate type battery may be 14.4 volts. If the battery 110 is a lithium iron phosphate type battery and a charging current is applied by a lead acid type battery charger, then the battery 110 will not be fully charged before the charging device stops applying the charging current unless the battery management system 100 modifies a voltage level detectable by the charging system through the terminals 182, 184.

In one or more operating profiles, the battery management system 100 may modify a voltage difference and/or a resistance between the terminals 182, 184 to indicate to a charging device to stop applying a charging input. For example, based on inputs received from the temperature detection subsystems 122, 132, the voltage/current detection subsystems 126, 136, and the external communication subsystems 128, 138, one or more of the node controllers 112, 114 may activate the output control circuit 170 to modify a resistance between the terminals 182, 184, thereby increasing a voltage between the terminals 182, 184 and causing the charging device to cease applying the charging current. Modifying a resistance between the terminals 182, 184 using the output control circuit 170 is further described with reference to FIG. 4.

A benefit of modifying the voltage level between the terminals 182, 184 is that the battery 110 may mimic a battery of a particular type of battery chemistry in order to be compatible with a charging device adapted to batteries of that particular chemistry. Hence, the battery 110 may ensure that the charging device terminates a charging input at a charge level that is compatible with the battery 110. A terminating charge level that is too high may overcharge the cells 151-154 and damage them. Further, in some embodiments, the battery management system 100 may ensure that the battery 110 is fully charged before the charging device stops applying a charging input.

In one or more operating profiles, the battery management system 100 may inhibit or block discharge of the cells 151-154. For example, the output control 170 may block or reduce a current running from the negative terminal 184 through the cells to the positive terminal 182. To illustrate, a high performance motorcycle equipped from a manufacturer with a lead acid battery having a nominal voltage of 12 volts and weighing several pounds might be retrofitted with a newer chemistry lithium iron phosphate battery being much lighter and having greater power storage capacity. As shown in Table 1, the lithium iron phosphate battery may have a significant discharge roll off at 20% charged or 12.6 volts resting voltage. The lead acid battery at that same resting voltage would be over 80% charged. Hence, as can be seen by the Table 1, a lithium iron phosphate type battery discharges much quicker as the charge level of the battery drops. Inhibiting or blocking discharge of the battery 110 as the battery charge level drops may protect the cells 151-154 from becoming entirely depleted and potentially damaged.

As an example, if a voltage level of the battery 110 is allowed to go too low without receiving a charging current, the cells 151-154 may become depleted and lose a portion of their operating capacity. A fully discharged lithium iron phosphate type battery may have a minimum voltage of 10.0 volts. If a load is applied to the terminals (e.g., the terminals 182, 184) of the battery (e.g., the battery 110) after the battery has discharged to 10.0 volts, then the cells (e.g., the cells 151-154) may become permanently damaged. To prevent the damage, if the battery voltage continues to drop past a threshold (e.g., 12.6 volts or 20% of the battery capacity) one or more of the node controllers 112, 114 may initiate cutting off an output current using the output control circuit 170. Thus, instead of being allowed to drop to 11.6 volts (associated with 20% of the battery capacity of a lead acid battery), the battery 110 may only be permitted to drop to 12.6 volts (associated with 20% of the battery capacity of a lithium iron phosphate type battery), thereby preserving the cells 151-154.

By inhibiting the output current 192 at the output control 170, the battery management system 100 may cause a reduction in voltage to devices that may be coupled to and contributing to the load of the battery 110. In response to the reduction in power, the devices may draw less power or stop working Examples of devices that may be coupled to the battery include warming vests worn by riders in cold climates and high energy headlights. By drawing less power and/or ceasing to work, the devices may indicate to a user to switch off unnecessary accessories and/or lower the battery load level while the engine keeps running in order to save the battery from failure and/or cell damage.

In one or more operating profiles, the battery management system 100 may provide a low current output to a load. For example, when the battery 110 has been turned off (i.e., the output control 170 is inhibiting discharge of the cells 151-154) due to a low charge level, overly high current demand, or other environmental factor, the output control 170 may be configured to enable a low power (e.g., a low current or high impedance) output from the cells 151-154. The low power output may enable the battery management system 100 to measure and assess load conditions using the voltage/current detection subsystem 126 and determine if a higher current output should be turned on and made available to the load.

To illustrate, responsive to the one of the node controllers 112, 114, the output control 170 may turn off the battery output and switch on a lower power output to enable the battery management system 100 to sample an external load coupled to the terminals 182, 184 and determine if the external load falls below a threshold. Upon detection that the external load has fallen below the threshold, the node controllers 112, 114 may cause the output control circuit 170 to turn the battery output back on. For instance, if a motorcycle rider idles slowly with a very bright headlight and warming vest or other high current accessory engaged such that a voltage level of the battery falls below a threshold, one of the node controllers 112, 114, may switch off the battery output by instructing the output control 170 to inhibit the output current 192.

A benefit of activating the low power output is that repeated attempts to turn on the battery output (at full power) may be avoided. Repeated attempts to turn on the battery output may result in further draining the battery 110, confusing the rider as to the state of a vehicle charging system, and/or damaging a device connected to the battery 110 through power surges. If a motorcycle rider has switched off the motorcycle and needs access to low current electronics to further manage the bike or determine its state the rider could switch off all unnecessary accessories and wait a few moments for the battery management system 100 to turn on the low current output. If the battery management system 100 measures little or no load via the voltage/current detection subsystem 126, the output control 170 may turn the battery output on and allow low power systems to be powered again while the rider waits for the battery 110 to recover. This could then enable the rider to see charge levels or otherwise manually start the machine in order to move to enter the battery management system 100 into a more preferable operating state or to wait long enough for the battery 110 to recover to start the motorcycle if it is not already running.

In one or more operating profile, the battery management system 100 may absorb a current spike from a charging device while the battery output is disabled by the output control circuit 170. For example, current passing through the output control 170 may be inhibited only in the direction of a discharge current (from the negative terminal 184 to the positive terminal 182), thereby enabling a charging current (from the positive terminal 182 to the negative terminal 184) to flow through the output control 170 uninhibited. If the battery 110 is fully charged and a high current is flowing in or out of the battery 110 and if the output of the battery 110 is switched off, an inherent inductance from charging or starting systems may create a large current spike resulting from the sudden loss of load. Further, if the motorcycle is running and the battery has been depleted a high current may be running from a charging system to the load. If the load is sporadic then the charging current may be sporadic such that switching off the output of the battery may induce a large inductive kick back into the charging system.

It is therefore advantageous to be able to turn off the output current 192 to prevent over discharge of the battery 110 while enabling the inductive current to enter the battery 110 upon inductive reflection and enabling the battery 110 to act as a current sink absorbing the current spike, or at least significantly attenuating a voltage of the current spike, thereby preventing damage to the battery management system 100 the charging system, or another system coupled to the battery 110.

In one or more operating profile, the battery management system 100 may perform cell balancing between the cells 151-154. An embodiment of a system for performing cell balancing is described further with reference to FIG. 3.

In one or more operating profiles, the battery management system 100 may communicate with a remote communication device. An embodiment of communication between a battery management system and a remote communication device is described further with reference to FIG. 5.

A benefit of the battery management system 100 is that the node controllers 112, 114 have access, via the node subsystems 120, 130, to information concerning a load profile the battery has recently been subjected to, a charge profile of a charging system coupled to the battery 110, a current state of the battery 110, environmental factors such as temperature, and if the battery 110 is in a vehicle the current running state of the vehicle (as determined by the voltage/current detection subsystems 126, 136 and the external communication subsystems 128, 138). The battery management system 100 has the ability to make configuration changes within the battery 110 and to request changes from an outside environment. Other battery maintenance services may be performed by the battery management system 100 including but not limited to heating the battery at cold temperatures, where expenditure of stored power for a short duration enables the battery to readily provide power to a load. The battery management system 100 may further indicate the state of the battery to an external communication device. Specific algorithms for determining which of the operations described herein to perform may be determined based on an operating profile as described further with reference to FIGS. 8-11.

Another benefit of the battery management system 100 is that the battery 110 may receive a charging input intended for a different battery type. For example a charging profile intended for lead acid batteries is not fully compatible with the needs of a LiFePO4 battery. The battery management system 100 enables adaptation of the charging input and provides responses (e.g., modified voltage differences) at the terminals 182, 184 that may cause a charging device to behave compatibly.

Node Controller Communication System

Figure 2:
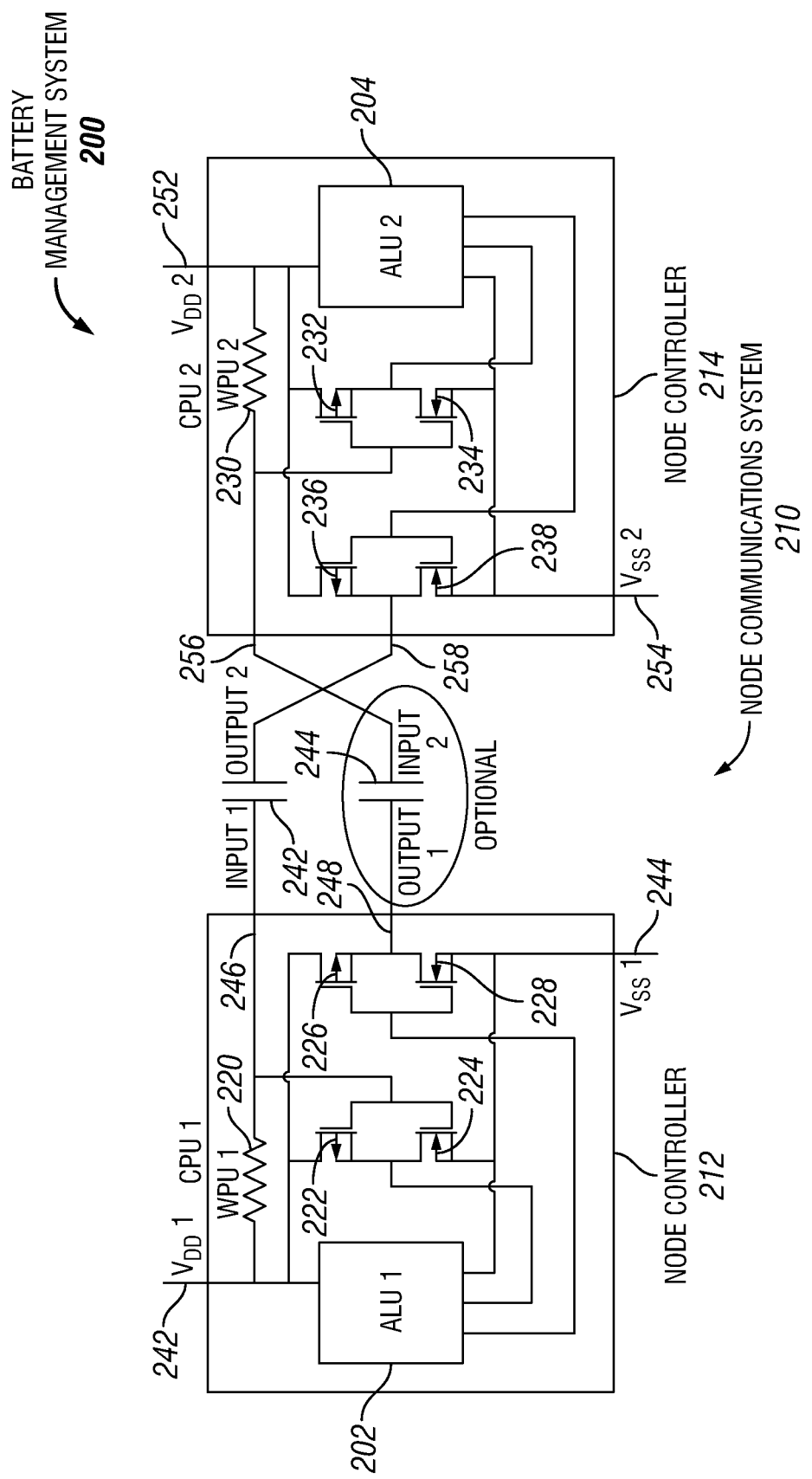
FIG. 2 is a block diagram illustrating an embodiment of a battery management system including a node communication system.

Referring to FIG. 2, a block diagram of a battery management system 200 that includes a node controller communication system 210 is depicted. The node controller communication system 210 may enable communication between a node controller 212 and a node controller 214. In an embodiment, the node controller 212 corresponds to the node controller 112 and the node controller 214 corresponds to the node controller 114. The communication system depicted in FIG. 2 may enable the node controllers 212, 214 to communicate with one another in cases where the node controllers 212, 214 have a different voltage reference and are communicating through a DC signal path, as described herein.

The node controller 212 may include an arithmetic logic unit (ALU) 202, a weak pull-up (WPU) resistor 220, a transistor 222, a transistor 224, a transistor 226, and a transistor 228. Although FIG. 2 depicts the WPU resistor 220, the transistor 222, the transistor 224, the transistor 226, and the transistor 228 as being incorporated into the node controller 212, in other embodiments one or more of the WPU resistor 220, the transistor 222, the transistor 224, the transistor 226, and the transistor 228 may be distinct from and positioned external to the node controller 212.

The WPU resistor 220 may be positioned between a power input 242 (e.g., VDD1) and a signal input 246 (e.g., Input 1) of the node controller 212. The signal input may further be coupled to controllers associated with the transistor 222 and the transistor 224. A resistance of the WPU resistor 220 may be small enough that the controllers associated with the transistors 222, 224 may correspond to a logical high value when no signal is being received at the signal input 246. For example, a voltage of the input 246 may be substantially near a voltage of the power input 242.

The transistors 222, 224 may form an input transistor network. For example, a first terminal of the transistor 222 may be coupled to the power input 242, a second terminal of the transistor 222 may be coupled to an input of the ALU 202 and to a first terminal of the transistor 224, and a second terminal of the transistor 224 may be coupled to a common voltage 244 (e.g., VSS1). In an embodiment, the transistor 222 is a p-type field-effect transistor (FET), the transistor 224 is an n-type FET, and the controllers are gates. Other transistors are also possible.

The transistors 226, 228 may form an output transistor network. For example, an output of the ALU 202 may be coupled to controllers associated with the transistor 226 and the transistor 228. A first terminal of the transistor 222 may be coupled to the power input 242, a second terminal of the transistor 222 may be coupled to an input of the ALU 202 and to a first terminal of the transistor 224, and a second terminal of the transistor 224 may be coupled to a common voltage 244 (e.g., VSS1). In an embodiment, the transistor 226 is a p-type FET, the transistor 228 is an n-type FET, and the controllers are gates. Other transistors are also possible.

The node controller 214 may be similar to the node controller 212. For example, the node controller 214 may include an ALU 204, a WPU resistor 230, a transistor 232, a transistor 234, a transistor 236, and a transistor 238. Further, the node controller 214 may be include a power input 252 and a common voltage 254 and may send and receive signals via a signal input 256 and signal output 258.

The signal input 246 of the node controller 212 may be coupled to the signal output 258 of the node controller 214 via a capacitor 242. Likewise, the signal input 256 of the node controller 214 may be coupled to the signal output 248 of the node controller 212 via a capacitor 244. The capacitors 242, 244 may substantially block direct currents from passing between the node controllers 212, 214. Hence, the node controllers 212, 214 are not in direct current (DC) contact with each other because they are connected through the capacitors 242, 244.

During operation, the node controller 212 may communicate a status of battery cells to which the node controller 212 is connected to the node controller 214 via the output 248, the capacitor 244, and the input 256. The node controller 214 may likewise communicate with the node controller 212. A communication data rate may depend, among other things, on the charge and discharge rates of the capacitors 242, 244 and I/O threshold levels. To illustrate, both of the node controllers 212, 214 may float their output pins to high (being pulled up by the WPU resistors 220, 230 as described herein). When either node controller (e.g., the node controller 212) changes its output (from high to low) the signal input of the other node controller (e.g., the node controller 214) will be pulled low. The node controller 214 will temporarily see a low input at the signal input 256. If the node controller is powered by 5V the complementary metal-oxide-semiconductor (CMOS) input/output (I/O) structure (including, for example, the transistors 232, 234) on the signal input 256 may have a low voltage threshold of about 1 volt. The signal input 256 will remain low for a time period defined by the RC time constant t=R*C. When the voltage change is from an initial voltage output low at nearly to the voltage threshold with a power voltage:

$$t = -\ln\left(\frac{V - V_c}{V}\right) R * C \qquad \text{Equation 1}$$

where V is the power voltage (e.g., VDD2), Vc is the voltage threshold, R is the resistance of the WPU resistor 230, and C is the capacitance of the capacitor 244. If the initial voltage is 0 volts, the threshold voltage is 1 volt, and the power source voltage is 5 volts, R=25KΩ and C=0.01 μF:

$$t = -\ln\left(\frac{(5-1)}{5}\right) 25000 * 0.00000001 \qquad \text{Equation 2}$$

$$t = 0.00005786 \text{ or about } 56 \text{ μs} \qquad \text{Equation 3}$$

In this case, the minimum transmission frequency f=1/t=17925 Hz. Therefore a data input sampling rate of over 20 KHz would be sufficient to detect these I/O changes. The data could therefore be transmitted at about 20 KHz or higher and be sufficiently fast enough to overcome loss of I/O status at that sampling rate. As I/O implementations for modern CPUs are in the MHz range, 20 KHz is sufficiently simple to process.

Although FIG. 2 depicts the node communication system 210 as including two communication signal lines with each of the node controllers 212, 214 having distinct signal inputs 246, 256 and signal outputs 248, 258 (e.g., a two-channel full duplex system), persons of ordinary skill in the art would understand that the communication system could be reduced to include one communication signal line when the signal inputs 246, 256 are combined with the signal outputs 248, 258 to form one signal input/output for each of the node controllers 212, 214 (e.g., a single half duplex system). For example, in other embodiments, there may be one signal path where communication is in one direction or is half duplex and each of the node controllers 212, 214 wait for the other node controller to finish communicating.

Cell Balancing Subsystem

Figure 3:
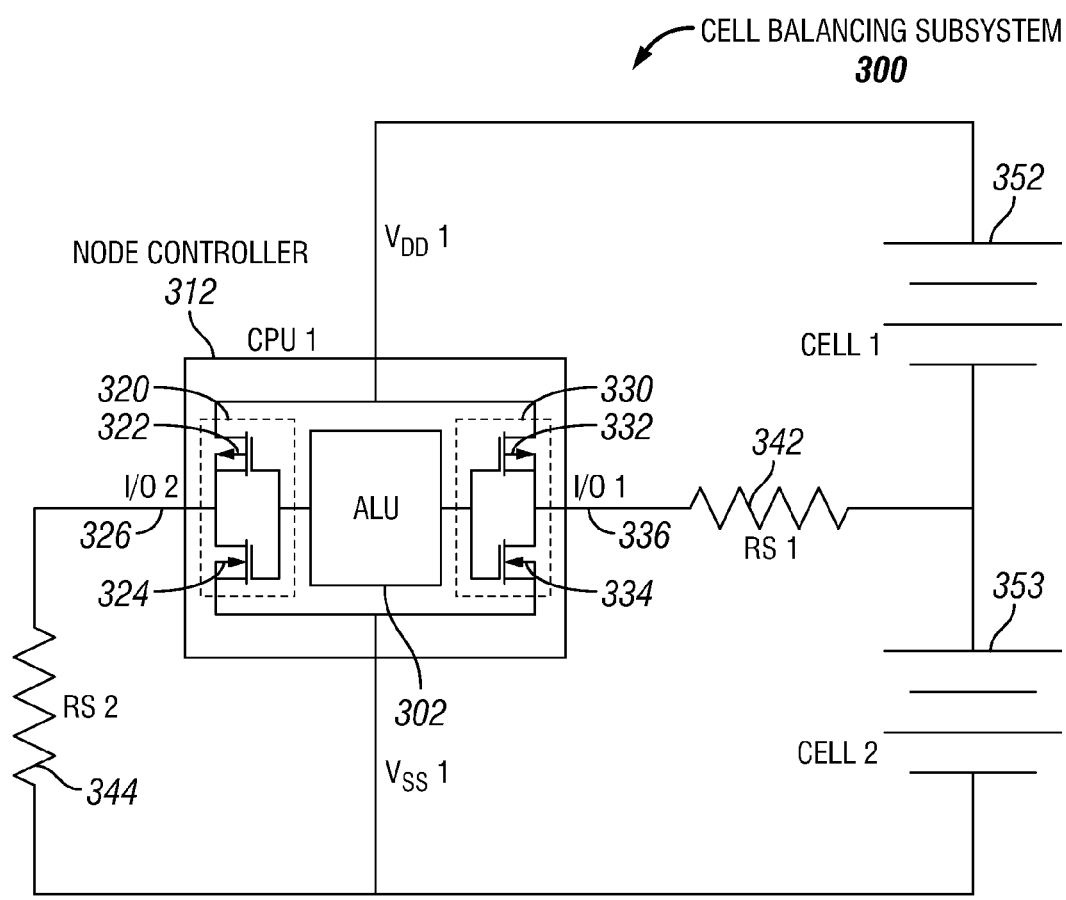
FIG. 3 is a block diagram illustrating an embodiment of a battery management system including a cell balancing subsystem.

Referring to FIG. 3, a block diagram of an embodiment of a battery management system including a cell balancing subsystem 300 is depicted. The cell balancing subsystem 300 may correspond to one or more of the cell balancing subsystems 124, 134. For example, the battery management system may include a node controller 312 and multiple cells 352, 353. The node controller 312 may correspond to one or both of the node controllers 112, 114 and the cells 352, 353 may correspond to two or more of the cells 151-154. Further, the node controller 312 may include an arithmetic logic unit (ALU) 302 to perform processing operations, as described herein.

The cell balancing subsystem 300 may include a transistor network 320, a transistor network 330, a resistor 344, and a resistor 342. Although FIG. 3 depicts the transistor network 320 and the transistor network 330 as forming part of the node controller 312, in other embodiments, one or more of the transistor network 320 and the transistor network 330 may be positioned outside of the node controller 312.

The transistor network 320 may include a transistor 322, a transistor 324, and an output 326. The transistor 322 may be positioned between a voltage supply (e.g., VDD1) and the output 326. The voltage supply may be coupled to the cell 352. The transistor 324 may be positioned between a common voltage supply (e.g., VSS1) and the output 326. Control inputs of the transistors 322, 324 may be coupled to a first output of the ALU 302. The transistor network 330 may be similar to the transistor network 320. For example, the transistor network 330 may include a transistor 332, a transistor 334, and an output 336, positioned as described with reference to the transistor network 320. Control inputs of the transistor 332 and the transistor 334 may be coupled to a second output of the ALU 302. In an embodiment, the transistors 322, 332 are p-type FETs and the transistors 324, 334 are n-type FETs. Other types of transistors are also possible.

The resistor 342 may be positioned between the output 336 and the cells 352, 353. As depicted in FIG. 3, the resistor 342 may be coupled to a node between the cells 352, 353. The resistor 344 may be positioned between the output 326 and the cell 353. In an embodiment, one or more of the resistors 342, 344 correspond to heating elements. For example, the resistors 342, 344 may correspond to the heating elements 142, 146. As such, in some embodiments, current passing through the resistors 342, 344 may heat the cells 352, 353. A respective resistance of each of the resistors 342, 344 may be configured to enable a gradual discharge of the cells 352, 353 without an excessive loss of battery charge, such that the cells may become balanced over time.

During operation, the node controller 312 may determine that one or both of the cells 352, 353 are imbalanced. The determination may be based voltage measurements (e.g., voltage measurements received via one or more of the voltage/current detection subsystems 126, 136), based on communications received from another node controller, and/or based on communications received from a remote communication device. In response to the determination, the node controller 312 may place one both of the cells 352, 353 in a state of discharge. An embodiment of determining whether the cells 352, 353 are unbalanced is described further with reference to FIG. 9.

The node controller 312 may place the cell 352 in a state of discharge by signaling the control inputs of the transistors 332, 334 such that the transistor 332 is enabled and the transistor 334 is disabled. Enabling the transistor 332 may enable a current to flow from the cell 352 through the resistor 342 while disabling the transistor 334 may block a current from the cell 353 through the resistor 342. Hence, the cell 352 may be discharged through the resistor 342 while the cell 353 may hold its charge level.

The node controller 312 may place the cell 353 (instead of the cell 352) in a state of discharge by signaling the control inputs of the transistors 332, 334 such that the transistor 332 is disabled and the transistor 334 is enabled. Enabling the transistor 334 may enable a current to flow from the cell 353 through the resistor 342 while disabling the transistor 332 may block a current from the cell 352 through the resistor 342. Hence, the cell 353 may be discharged through the resistor 342 while the cell 352 may hold its charge level.

The node controller 312 may place each of the cells 352, 353 in a state of simultaneous discharge by signaling the transistors 322, 324 such that the transistor 322 is enabled and the transistor 324 is disabled. Enabling the transistor 322 may enable a current to flow from both of the cells 352, 353, through the resistor 344, thereby discharging both of the cells 352, 353.

The discharge rate of the cells 352, 353 need not be very high because the battery management system may manage charge levels on the cells 352, 353 for long periods of time such that a balance is reached overnight for instance, over a single day, over a number of days, after a first charge cycle (including charging and discharging the cells 352, 353), or over several cycles of charge. To illustrate, a typical motorcycle might have a 7 amp-hour battery capacity and each cell may have a 7 amp-hour output over its rated voltage range. If one cell is significantly (e.g. 50%) out of balance then in a 24 hour period the state of the other cells could need to be reduced significantly (e.g., as much as 50%*7 amp-hours over 24 hours). In an embodiment, balancing the cells 352, 353 may include drawing a current 25 mA from one or both of the cells 352, 353 over a 24 hour period. Discharging the cells 352, 253 at this rate may protect the node controller 312 from high currents. For example, 25 mA is well within the specification of I/O pins for many microcontrollers, as may be used to implement the node controller 312. In other embodiments, external devices (e.g., FETS or other switching elements) may be added to the node controller 312 such that the current is outside of the node controller 312.

Although FIG. 3 depicts only one node controller, as described herein, the battery management system may include multiple controllers. The node controller 312 may communicate with other nodes to determine a state of discharge for the cells 352, 353. Further, other node controllers may determine a state of discharge for other cells while synchronizing cell balancing operations with the node controller 312. For example, if three cells in a four cell stack needed to be discharged to reach a balanced state then one node controller (e.g., the node controller 312) could be discharging two cells (e.g., the cells 352, 353) while the other node discharges only one of two cells until charge levels of all four of the cells become balanced. Further, as persons of ordinary skill in the art will recognize, the cell balancing system 300 may scale to any number of cells such that any plurality of cells can be managed with a resolution of control down to any individual cell.

Voltage/Current Detection Subsystem and Output Control Subsystem

Figure 4:
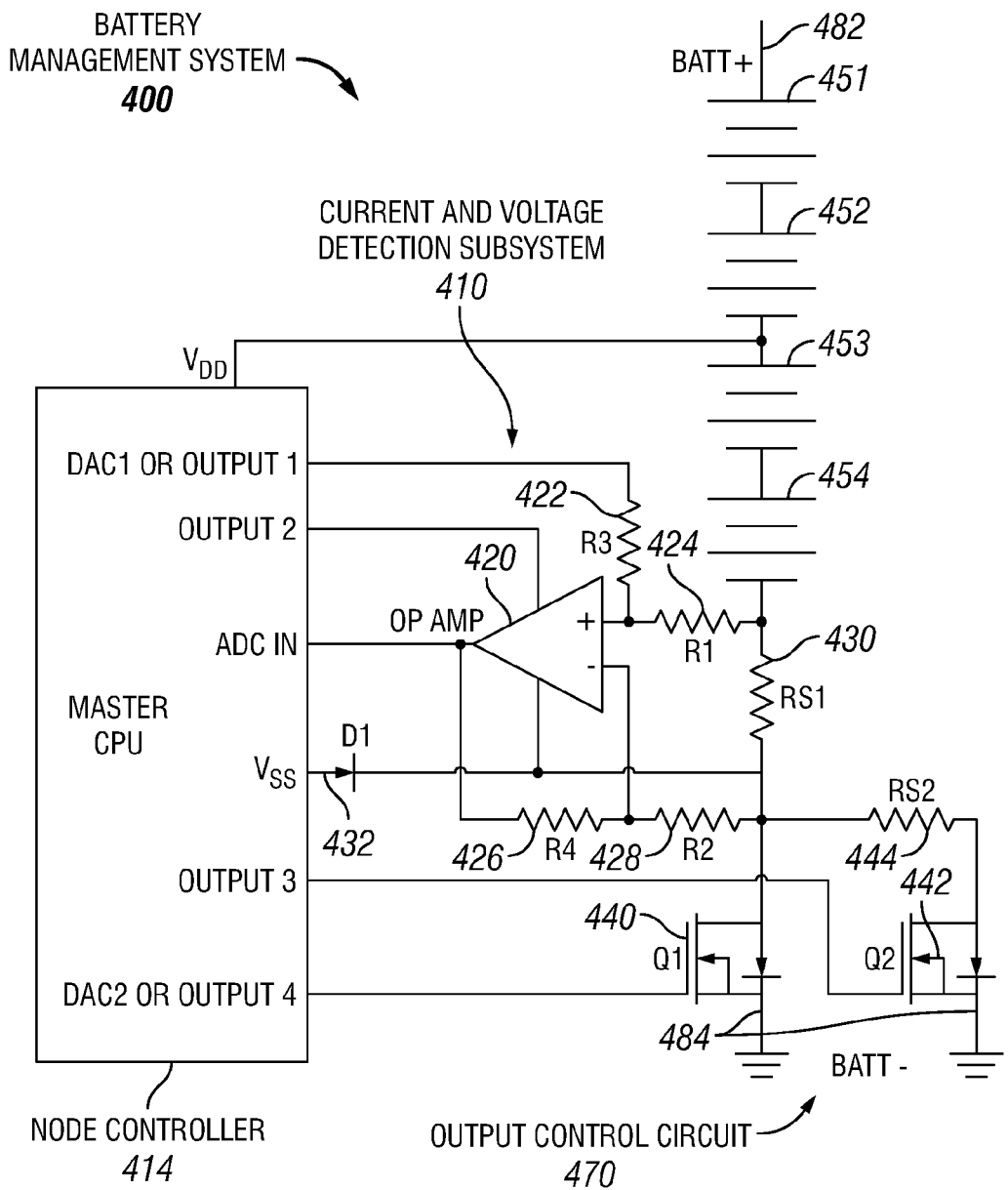
FIG. 4 is a block diagram illustrating an embodiment of a battery management system including a voltage/current detection subsystem and an output control circuit.

Referring to FIG. 4, a block diagram of an embodiment of a battery management system 400 that includes a voltage/current detection subsystem 410 and an output control circuit 470 is depicted. The battery management system 400 may further include a node controller 414, multiple cells 451-454, a positive terminal 482, and a negative terminal 484. Further, the battery management system 400 may correspond to the battery management system 100. For example, the node controller 414 may correspond to one of the node controllers 112, 114, the cells 451-454 may correspond to the cells 151-154, and the terminals 482, 484 may correspond to the terminals 182, 184.

The voltage/current detection subsystem 410 may correspond to one of the voltage/current detection subsystems 126 or 136 and may include an op amp 420, a resistor 422, a resistor 424, a resistor 426, a resistor 428, a resistor 430, and a diode 432. The op amp 420 may be couple to a first output of the node controller 414 at a first reference input and may be coupled to a diode 432 at a second reference input.

A first signal input of the op amp 420 may be coupled to the resistor 422 and to the resistor 424. A second signal input of the op amp 420 may be coupled to the resistor 426 and to the resistor 428.

The resistors 422, 424, 426, 428 may be used to configure the op amp 420 in a current detection configuration. For example, the resistor 422 may be further coupled to a second output of the node controller 414, the resistor 424 may further be coupled to an end of a stack including the cells 451-454, the resistor 426 may further be coupled to an output of the op amp 420, and the resistor 428 may be further coupled to a resistor 430. The diode 432 may be coupled to a common voltage output of the node controller 414.

The resistor 430 may be positioned between the resistor 428 and the resistor 424 such that a voltage across the resistor 430 may be received by the op amp 420 via the resistor 424 at the first signal input and via the resistor 428 at the second signal input. This configuration of the op amp 420 may enable the op amp 420 to amplify the weak signal and enable measurement of a current through the resistor 430. An output of the op amp 420 may be coupled to an analog-to-digital converter (ADC) input of the node controller 414. Hence, the op amp may provide an indication of an amount of current flowing through the resistor 430 to the node controller 414.

The voltage/current detection subsystem 410 may include additional circuitry (not shown) to provide an indication to the node controller 414 of a voltage level of one or more of the cells 451-454 or of a voltage difference between the terminals 482, 484. In an embodiment, the voltage/current detection subsystem 410 may rely wholly or in part on communication received from another node controller to determine voltage levels. For example, the node controller 414 may be configured to measure voltages corresponding to only a subset of the cells 451-454 (e.g., the cells 453, 454). Another node controller may be coupled to the remaining cells (e.g., the cells 451, 452) and may communicate the voltage levels of the remaining cells to the node controller 414 as described with reference to FIG. 2. Other types of transistors are also possible.

The output control 470 may correspond to the output control 170 and may include a transistor 440, a transistor 442, and a resistor 444. The output control 470 may be positioned in series with the cells 451-454 between the terminals 482, 484. For example, a first terminal of the transistor 440 may be coupled to the stack of cells 451-454 via the resistor 430. A second terminal of the transistor 440 may be coupled to the negative terminal 484. Likewise, a first terminal of the transistor 442 may be coupled to the stack of cells 451-454 via the resistor 444 and the resistor 430 and a second terminal of the transistor 442 may be coupled to the negative terminal 484. A control input of the transistor 440 may be coupled to a third output of the node controller 414 and a control input of the transistor 442 may be coupled to a fourth output of the node controller 414. In an embodiment, the transistors 440, 442 are n-type FETs including intrinsic body diodes, oriented such that their intrinsic body diodes are forward biased in the direction of a charging current.

The output control 470 may be configured to perform several operations including blocking or reducing an output current, absorbing a current spike, adjusting a voltage between terminals of the battery, and enabling a high-impedance/low-current output, as described further herein.

The output control 470 may inhibit or block an output of the cells 451-454 by disabling the transistor 440. For example, the node controller 414 may refrain from applying a voltage to a control input of the transistor 440 in response to a voltage of the battery falling below a threshold. Refraining from applying a voltage to the control input may disable the transistor 440 and substantially block current from passing through the transistor 440. Because the transistor 440 is in series with the cells 451-454, disabling the transistor 440 may disable an output current of the cells 451-454 (e.g., a battery output).

While the output control 470 has disabled the battery output the output control 470 may be configured to enable charge input to pass into the battery despite the battery output being disabled. For example, the transistor 440 may exhibit the characteristics of an intrinsic body diode when the transistor 440 is disabled. This intrinsic body diode effect may be referred to as a body diode of the transistor 440. When a charging input (e.g., a current passing from the positive terminal 482 to the negative terminal 484) is applied to the cells 451-454, the current may flow through the intrinsic body diode of the transistor 470. Even when the transistor 440 is disabled, if the charging input voltage is more than a diode voltage drop of the transistor 440 above the total battery voltage, then the body diode will be forward biased and current will flow into the battery. In this way when the battery output is inhibited or turned off, any inductive kickback may be absorbed by the battery and a voltage across the battery may not spike or cause damage to the battery or one or more devices coupled to the battery. Hence, the transistor 440 enables a "load dump" current sink to the battery and enables inductive kicks applied to the terminals 482, 484 to be dumped back into the battery until the inductive energy is dissipated. In this way the output control 470 may safely disable battery discharge to high energy loads without causing damage to the battery and/or systems coupled to the battery. In some embodiments, a diode may be placed in parallel to the transistor 440 and its body diode if a lower voltage drop is desired.

The output control 470 may also adjust a voltage difference between battery terminals 482, 484. For example, if the node controller 414 determines that a charging input should be terminated, the node controller 414 may apply a voltage to the control input of the transistor 440 to operate the transistor 440 in an A-class operation, thereby causing an increased resistance at the transistor 440 such that an increased voltage is presented to a charging device at the battery terminals. The increased voltage may be due to the increased resistance in the presence of a current associated with a charging input. Upon detecting the increased voltage, the charging device may terminate a charging input. To illustrate, if a charging device has been designed to charge a battery of a chemistry type that would normally allow discharge below that which the installed battery chemistry should operate, then the node controller 414 may operate the transistor 440 in a resistive mode to trigger charge input cut-off.

Another way in which the output control 470 may adjust a voltage difference between battery terminals, particularly when no charging current is present, is by disabling the transistor 440. When the transistor 440 is disabled, a voltage drop associated with a body diode of the transistor 440 may be added to a total voltage level of the cells 451-454 at the terminals of the battery. The extra diode drop (which may be approximately 0.7V) may trigger a charging device, configured for lead acid type batteries, to terminate a charging input. For example, the charging device may determine that the battery charge level is at a lower voltage than is compatible with lead acid type batteries, but which is compatible with lithium iron phosphate type batteries.

By modifying an output voltage of the battery, the battery management system may enable the battery to receive a charge input with a charging profile intended for a battery with a different chemistry or cell arrangement and to provide feedback (e.g., the modified voltage between the terminals) compatible with the charging device. Hence, the battery may be charged by an otherwise incompatible charging device. A major difference between lithium based cell chemistries and lead acid cell chemistries is the different discharge levels. By modifying the output charge, the output control 170 provides for most of the needs of adaptation.

When the battery has been turned off (due to low charge, overcurrent demand or other environmental factors) the output control 470 may be configured to enable a low-current/high-impedance output from the cells 451-454. For example, when the transistor 440 is disabled, a high-current output from the cells 451-454 may be inhibited, effectively turning off the battery with respect to a load attached to the battery. During this state, the transistor 442 may be enabled. A resistance of the resistor 444 may be sufficiently high to limit the current drawn from the cells 451-454 by the load. To illustrate, the resistor 444 may limit the current drawn from the cells 451-454 to approximately 30 mA.

The low-current/high-impedance output may enable measurement of battery load conditions and a determination of whether the battery should be turned on may be performed by the node controller 414. For example, if a low voltage drop is measured across the resistor 444, indicating that no load or a light load is attached to the cells 451-454, then the transistor 440 may be activated to enable the high current output. By presenting a low-current-high-impedance output, the output control 470 may protect the cells 451-454 from being overly discharged.

Battery Communication System

Figure 5:
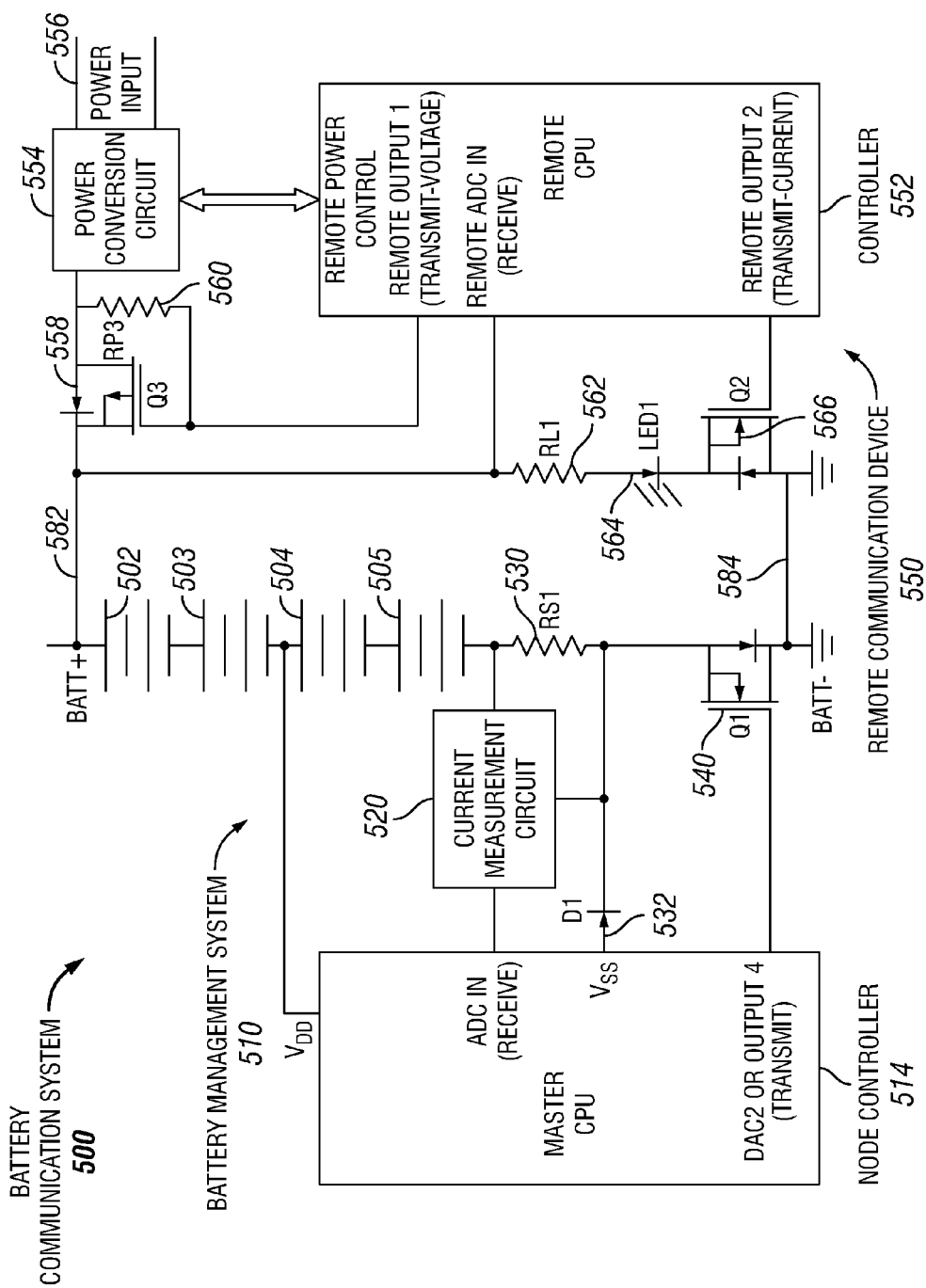
FIG. 5 is a block diagram illustrating an embodiment a battery communication system including a battery management system coupled with a remote communication device.

Referring to FIG. 5, a block diagram of an embodiment a battery communication system 500 including a battery management system 510 electrically coupled with a remote communication device 550 is depicted. The battery management system 510 may include a node controller 514, multiple cells 502-505, a current measurement circuit 520, a transistor 540, a resistor 530, and a diode 532. Further, the battery management system 510 may correspond to the battery management system 100. For example, the node controller 514 may correspond to the node controller 114 and/or the node controller 414, the cells 502-505 may correspond to the cells 151-154, the current measurement circuit 520, the diode 532, and the resistor 530 may correspond to one or both of the voltage/current detection subsystems 126, 136, and the transistor 540 may correspond to the output control circuit 170. The battery management system 510 may be coupled to the remote communication device 550 at a positive terminal 582 and at a negative terminal 584. The terminals 582, 584 may correspond to the terminals 182, 184.

As described with reference to FIG. 4, in an embodiment, the transistor 540 may be a FET and may inherently exhibit the characteristics of an intrinsic body diode when the transistor 540 is disabled. This intrinsic body diode effect may be referred to as a body diode of the transistor 540. In some embodiments, a diode may be placed in parallel to the transistor 540 and its body diode to adjust a voltage drop associated with the transistor 540 as described herein.

The remote communication device 550 may include a controller 552, a power conversion circuit 554, a transistor 558 coupled to a resistor 560, and a series coupling of a resistor 562, a light-emitting diode (LED), and a transistor 566. The battery management system 510 and the remote communication device 550 may be electronically coupled such that communication between the devices is enabled as described herein.

The controller 552 may include a processing element. To illustrate, the processing element may be configured (e.g., hardwired or programmed) to perform operations as described herein. In an embodiment, the processing element is general-type processing element and the controller 552 may also include a memory storing instructions that, when executed by the processing element, cause the processing element to perform operations as described herein. For example, the memory may be a non-transitory processor readable medium as described herein. The controller 552 may further include one or more inputs and/or outputs to transmit control signals and receive input from other devices of the remote communication device 550.

The power conversion circuit 554 may be positioned between a power input 556 and the transistor 558. The controller 552 may be in communication with the power conversion unit 554 such that the power conversion unit 554 may receive control signals from the controller 552. For example, the control signals may instruct the power conversion unit 554 to generate a charging current to be applied at the terminal 582 or to refrain from or stop generating a charging current.

The transistor 558 may be positioned between the power conversion circuit 554 and the positive terminal 582 of the battery management system 510 when the battery management system 510 and the remote communication device 550 are coupled to each other (i.e., when the battery is connected to the remote charging device 550). A control input of the transistor 558 may be coupled to an output of the controller 552. As with the transistor 540, in an embodiment, the transistor 558 may be a FET and may inherently exhibit the characteristics of an intrinsic body diode when the transistor 558 is disabled. Similarly, this intrinsic body diode effect may be referred to as a body diode of the transistor 558. The resistor 560 may be positioned between the control input of the transistor 558 and a terminal of the transistor 558. The resistor 560 may perform biasing functions to enable the transistor 558 to perform operations as described herein. In some embodiments, a diode may be placed in parallel to the transistor 558 and its body diode if a lower voltage drop is desired.

The transistor 566 may be positioned between the negative terminal 584 of the battery management system 510 and the LED 564 when the battery management system 510 and the remote communication device 550 are coupled. A control input of the transistor 566 may be coupled to an output of the controller 552.

During operation, the battery management system 510 may transmit signals to the remote communication device 550 using the transistor 540. The transmission may occur while the battery is in a charging state (receiving a charging current from the power conversion circuit 554), in a state of discharge (providing an output current to a load), or in a state of quiescence (neither receiving a charging current, nor providing current to a load).

When the battery is in charging state, the node controller may selectively enable and disable the transistor 540, thereby changing the battery voltage as seen at the terminals 582, 584. For example, while the battery management system 510 is in a charging state, a charging current may flow through the cells 502-505. In this case, when the transistor 540 is disabled, the body diode of the transistor 540 may be forward biased to the flow of the charging current and the body diode with an inherent voltage drop may generate a first voltage difference at the terminals 582, 584. When the transistor 540 is enabled, the body diode of the transistor 540 may be bypassed, thereby generating a second voltage at the terminals 582, 584 that is different than the first voltage. The transistor 540 may be selectively enabled and disabled (e.g., switched on and off) in response to commands from the node controller 514 to generate a signal at the terminals 582, 584. In some embodiments, a diode may be placed in parallel to the transistor 540 and its body diode if a lower voltage drop is desired.

When the battery is in a state of discharge or when the current flow is quiescent, the transistor 540 may be enabled by the node controller 514 and may further be driven in class A operations. For example, a control input of the transistor 540 may be coupled to an output of the node controller 514 that is capable of outputting a selectable voltage range, thereby enabling the controller 514 to select a voltage level to apply to the control input. By selectively applying a voltage level to the control input, the transistor 540 may be used as a programmable resistive element, where the resistance is affected by altering the voltage at the control input of the transistor 540. To illustrate, in embodiments where the transistor 540 is a FET, the gate voltage of the transistor 540 may be controlled such that the FET is not all the way on or off, and instead offers a programmable resistance. This results in a programmable resistance in the discharge path of the battery (i.e., in series with the cells 502-505) that enables adding pulses of voltage drops on the terminals 582, 584 when current is being drawn from the cells 502-505. The voltage drops may be detectable by the remote communication device 550 as described herein. Examples of outputs of the node controller 514 that may be capable of outputting a selectable voltage range include a digital-to-analog converter (DAC) output and/or a pulse-width modulation (PWM) circuit connected through a diode to an RC network.

In determining the size of the voltage drops, the voltage drops should be small enough that an amount of power dissipated by the transistor 540 does not exceed a maximum rating of the transistor 540. Faster and shorter pulses with lower voltage drops may exhibit less power dissipation and may cause less stress on the transistor 540 to help prevent overheating.

The remote communication device 550 may receive one or more signals from the battery management system 510 by detecting voltage changes at terminals 582, 584. For example, the positive terminal 582 may be coupled to an analog-to-digital converter (ADC) input of the controller 552. By monitoring the ADC input over a period of time, the controller 552 can detect changes in the voltage of the battery, thereby detecting a signal received from the battery.

Further during operation the remote communication device 550 may send signals to the battery management system 510. For example, when the battery is charging (i.e., a charging current is being applied by the power conversion unit 554 to the positive terminal 582 of the battery) the remote communication device 550 may selectively enable and disable the transistor 558. When the transistor 558 is disabled, the intrinsic body diode of the transistor 558 may be forward biased to the flow of the charging current and may generate a voltage drop at the terminal 582. When the transistor 558 is enabled, the intrinsic body diode of the transistor 558 may be bypassed, thereby eliminating the voltage drop. The transistor 558 may be selectively enabled and disabled (e.g., switched on and off) to generate a signal at the terminal 582. In some embodiments, a diode may be placed in parallel to the transistor 558 and its body diode for a lower voltage drop at the terminal 582.

Although, FIG. 5 depicts the remote communication device 550 as including the transistor 558 and the resistor 560 to modify and/or modulate a voltage applied to the battery, in other embodiments, the transistor 558 and the resistor 560 may be omitted. For example, the power conversion circuit 554 may be configured to modulate its output in response to instructions from the controller 552 to enable signal communication. To illustrate, the power conversion circuit may include a flyback-type circuit that changes a pulse-width modulation (PWM) to add dips in an output voltage applied to the battery. Either of the described configurations may enable the remote communication device 550 to affect a voltage difference between the terminals 582, 584, thereby communicating a signal to the battery, while the battery is charging. Further, in some embodiments, the power conversion circuit 554 or a second power conversion circuit may be included as part of the battery management system 510 within the battery to boost a charging input received from the power input 556 as may be apparent to persons of ordinary skill in the art having the benefit of this disclosure.

When the battery is not charging (i.e., the charging input is low or quiescent), the remote device may generate signals by selectively turning on and off (i.e., enabling and blocking a current through) the resistor 562 and the LED 564 in a cadence recognized by the battery management system 510. For example, the controller 552 may selectively enable and/or disable the transistor 566 to control a current through the resistor 562 and the LED 564. In an embodiment, the resistor 562 and the LED 564 are configured to draw a current between 10 mA and 20 mA. The current though the resistor 562 and the LED 564 may affect the charging current being applied by the power conversion unit 554. For example, when the resistor 562 and the LED 564 are disabled, a first charging current may be applied to the battery. When the resistor 562 and the LED 564 are enabled, a second charging current may be applied to the battery different than the first charging current. The charging current may be modulated to generate a signal receivable by the battery management system 510.

The battery management system 510 may detect signals received from the remote communication device 550 by measuring a voltage, a charging current, or a combination thereof at the battery. For example, a change in the charging current may result in a change in voltage across the resistor 530. The current measurement circuit 520 may use the voltage to across the resistor 530 to detect and measure changes in the charging current. The current measurement circuit 520 may communicate the changes to the charging current via an analog-to-digital (ADC) input of the node controller 514. By monitoring the ADC input, the node controller 514 may detect signals received from the remote communication device 550.

Using the battery communication system 500, the one or more node controllers (e.g., the node controller 514) of the battery management system 510 may send data to and/or receive data from the remote communication device 550 (e.g., a charging device) exterior to the battery using the battery terminals for connection to the external device. The remote communication device 550 may be enabled to provide information regarding the battery to a user and/or to other devices. Further, the remote communication device 550 may accept input from the user or from the other device and indicate fault conditions, user input, battery diagnostics, or any combination thereof to the battery management system 510. Further, the remote communication device 550 may send and receive commands to control the battery output and/or adjust a charging input to the battery.

A benefit of the battery communication system 500 is that the battery management system 510 may send an indication of a battery state to external device and to a user. For example, the operations described herein may enable the battery management system 510 to signal to an external device (including or attached to the remote communication device 550) that battery charge depletion is imminent. The external device, perhaps mounted on the motorcycle handlebar may trigger a user indication such as blinking a very bright LED or sounding a buzzer. A rider may then see that this condition existed and may take action to control the power demands on the battery by switching off unneeded accessories.

Schematic Descriptions

Figure 6:
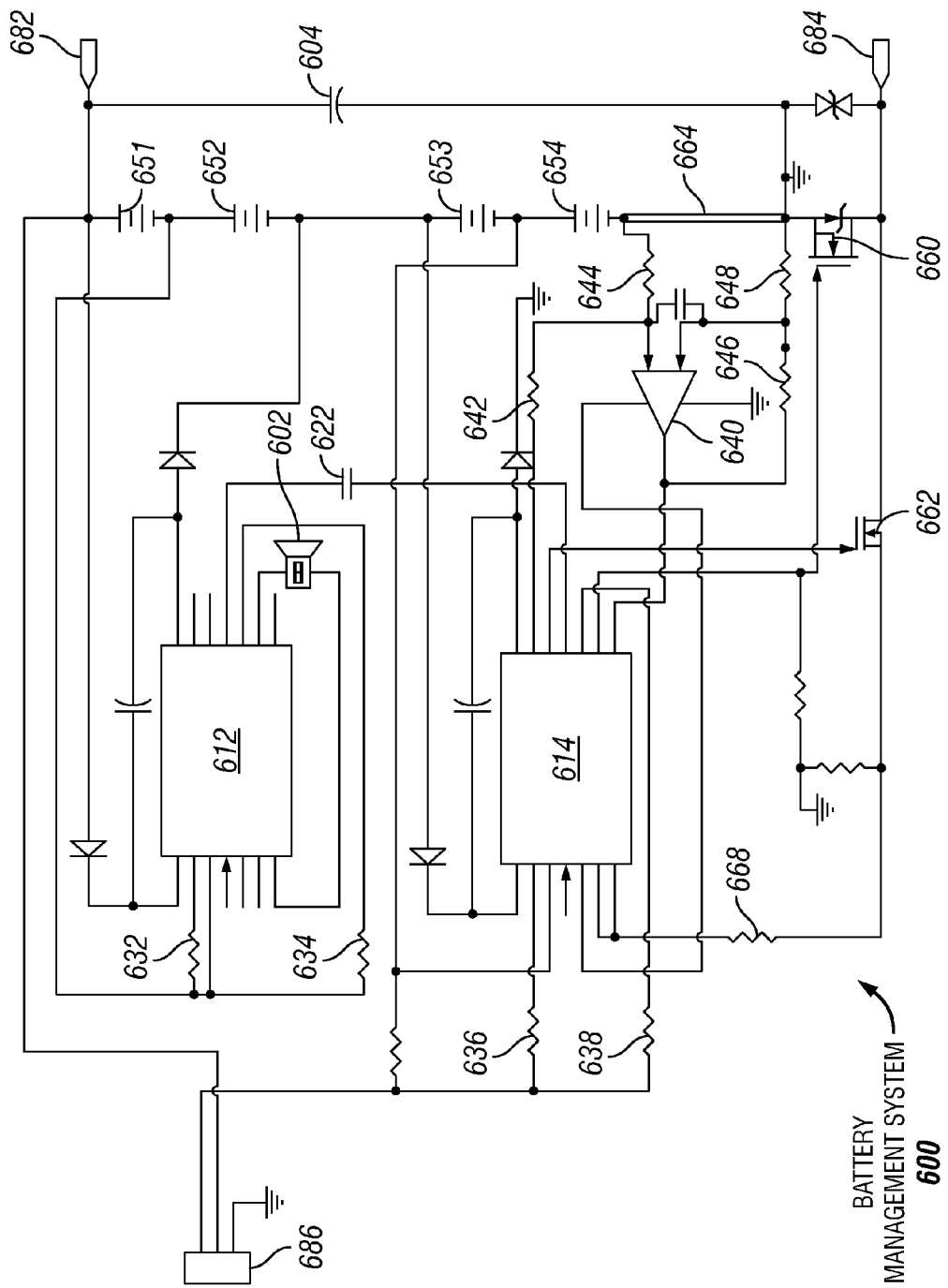
FIG. 6 is a schematic diagram illustrating an embodiment of a battery management system.

Referring to FIG. 6, a schematic diagram illustrating an embodiment of a battery management system 600 is depicted. The battery management system 600 may correspond to the battery management system 100 and may include a network of node controllers as described with reference to FIGS. 1 and 2, a node communication system as described with reference to FIG. 2, cell balancing subsystems as described with reference to FIG. 3, a current and voltage detection subsystem as described with reference to FIG. 4, and an output control circuit as described with reference to FIG. 5.

As described herein the battery management system 600 may manage operations at a battery. For example, the battery may include multiple cells 651-654, a positive terminal 682, and a negative terminal 684. The cells 651-654 may correspond to the cells 151-154 and the terminals 682, 684 may correspond to the terminals 182,184.

The network of node controllers of the battery management system 600 may include a node controller 612 and a node controller 614, which may correspond to the node controllers 112, 114. The node controllers 612, 614 may be configured to transmit data to and receive data from each other and to transmit data to and receive data from a remote communication device. For example, the battery management system may include a communication link 686 to enable the battery management system 600 to link to and communicate with a remote communication device. The communication link 686 may correspond to the communication link 186. As with the communication link 186, other embodiments of the battery management system 600 may omit the communication link 686 and may communicate through the terminals 682, 684. The node controllers 612, 614 may be arranged in a master and slave configuration, whereby one node controller does not have the ability to do all of the things the other node controller might, such as communicate through the terminals 682, 684, or read internal temperature. Inter-node communications may make data from one node available to all nodes within the network of node controllers.

The node communication system may include a capacitor 622 coupling an input/output pin of the node controller 612 to an input/output pin of the node controller 614. The capacitor 622 may correspond to one of the capacitors 242, 244. Other components of the node communication system may be included as part of the node controllers 612, 614.

The cell balancing subsystems may include a resistor 632, a resistor 634, a resistor 636, and a resistor 638. The resistors 632, 634 may correspond to a first cell balancing subsystem associated with the node controller 612 and the resistors 636, 638 may correspond to a second cell balancing subsystem associated with the node controller 614. With respect to the first cell balancing subsystem, the resistor 632 may correspond to the resistor 342 and the resistor 634 may correspond to the resistor 344. With respect to the second cell balancing subsystem, the resistor 636 may correspond to the resistor 342 and the resistor 638 may correspond to the resistor 344. Other components of the cell balancing subsystems may be included as part of the node controllers 612, 614.

The current and voltage detection subsystem may include an op amp 640 a resistor 642, a resistor 644, a resistor 646, and a resistor 648. The op amp 640 may correspond to the op amp 420, the resistor 642 may correspond to the resistor 422, the resistor 644 may correspond to the resistor 424, the resistor 646 may correspond to the resistor 426, and the resistor 648 may correspond to the resistor 428. The resistors may configure the op amp 420 to determine a voltage difference across a resistive element 664 and transmit an indication of a current through the resistive element 664 to the node controller 614. For example, the resistive element 664 may correspond to the resistor 430.

The output control circuit may include a transistor 660, a transistor 662 and a resistor 668. The transistor 660 may correspond to the transistor 440, the transistor 662 may correspond to the transistor 442, and the resistor 668 may correspond to the resistor 444. The output control circuit may operate as described with reference to FIG. 4.

The battery management system 600 may further include a signaling device 602. The signaling device 602 may be configured to generate a signal such as a light or an audible warning to a user of the battery. For example, if the cells 651-654 become depleted or if an output current of the cells 651-654 is too large for a predetermined period of time, the node controller 612 may instruct the signaling device 602 to generate the signal. The signal may prompt a user to reduce a load on the cells 651-654 or take other appropriate action to care for the battery. In an embodiment, the signaling device 602 includes a buzzer or alarm.

The battery management system 600 may also include a capacitor 604. The capacitor 604 may smooth an alternating current (AC) component of a charging input or of a discharge output at the terminals 682, 684. For example, the capacitor 604 enables cyclical energy from an alternator to be smoothed to cover direct current (DC) gaps made by a rotor transitioning through changes of polarity across stator windings which induce zero crossing voltages. The capacitor 604 also serves to dampen spikes created in response to the battery output being shut-off, such as in over-current shut-off conditions. The capacitor 604 is sized sufficiently large enough to smooth a DC voltage with an AC ripple to specifications required by a running engine so that the battery may continue to powering a DC ignition and other systems on the motorcycle.

Figure 7:
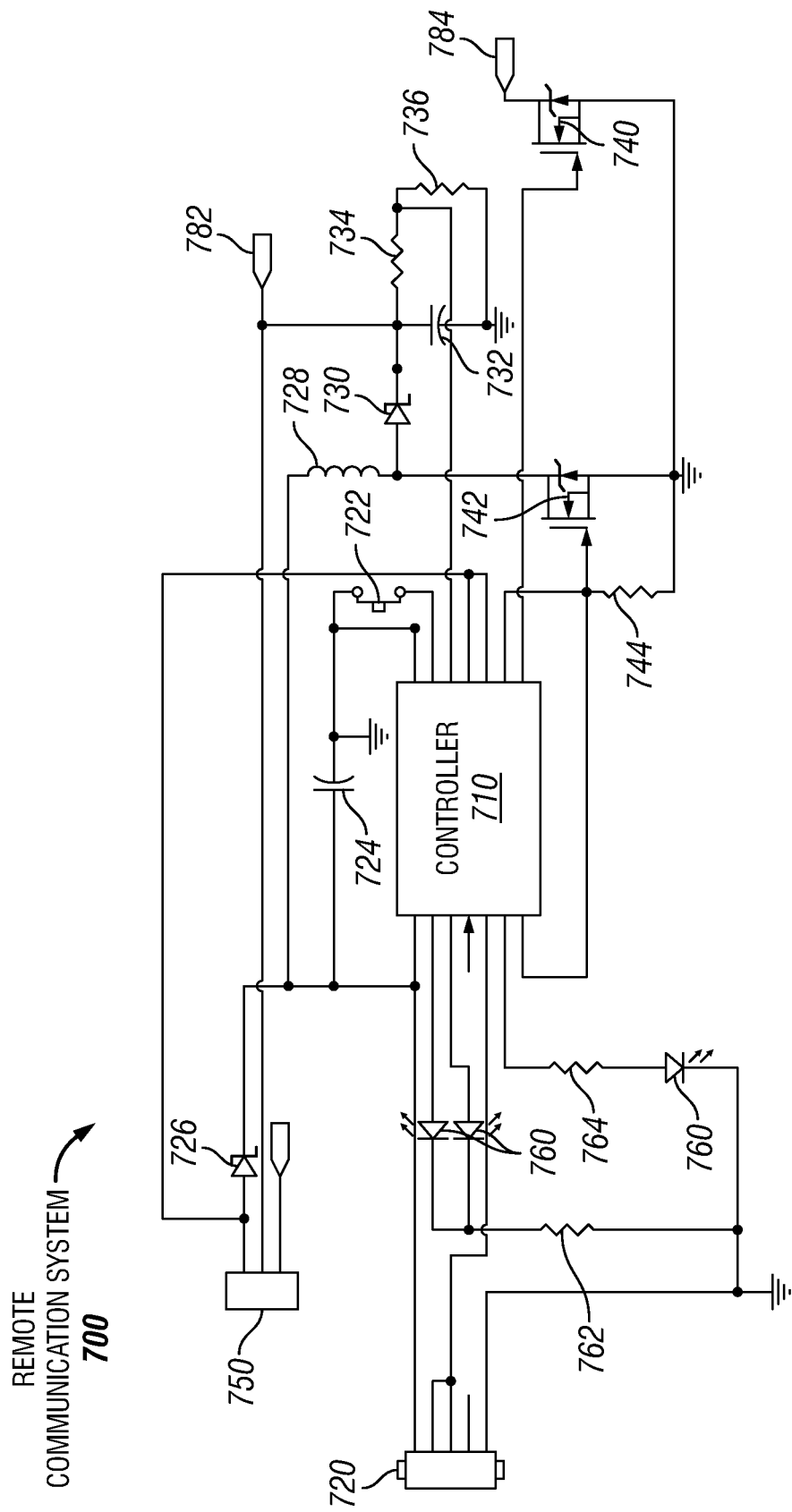
FIG. 7 is a schematic diagram illustrating an embodiment of a remote communication system usable with an embodiment of a battery management system.

Referring to FIG. 7, a schematic diagram illustrating an embodiment of a remote communication system 700 usable with an embodiment of a battery management system is depicted. The remote communication system 700 may correspond to a charger device and may convert a charging input from a universal serial bus (USB) port to a modified charging output usable to charge a battery. The charging output may enable a battery connected to the charger device to be charged by a trickle charging input while the battery is not in use.

The remote communication system 700 may include a controller 710, a USB interface 720, multiple transistors 740, 742, a communication interface 750, LEDs 760, a positive terminal 782, and a negative terminal 784. In an embodiment, the remote communication system 700 corresponds to the remote communication device 550. Hence, the controller 710 may correspond to the controller 552, one or both of the transistors 740, 742 may correspond to one or both of the transistors 556, 558, and the terminals 782, 784 may correspond to the terminals 582, 584.

The remote communication system 700 may further include power conversion circuits. For example, the remote communication system 700 may include a switch 722, a capacitor 724, a diode 726, an inductor 728, a diode 730, a capacitor 732, a resistor 734, and a resistor 736. The switch 722 may be positioned between one or more outputs of the controller 710 and the capacitor 724. The diode 726, the inductor 728, the diode 730, the capacitor 732, and the resistors 734, 736 may be positioned and configured so as to convert a power input received from the USB interface to a charging output usable to charge a battery. For example a voltage received from the USB interface 720 may be increased significantly and applied to the terminal 782. The USB voltage may be approximately 5 volts and a voltage usable with a charging input may exceed the voltage of a battery (e.g., approximately 13 volts). The voltage, as increased by the power conversion circuits may be used to charge a battery coupled to the terminal 782. Although FIG. 7 depicts the remote communication system 700 as including a USB interface, in other embodiments, the charging power may be received from any type of voltage source, such as a solar power device.

The transistors 740, 742, along with a resistor 744 may be controlled by the controller 710 to enable communication between the remote communication device 700 and a battery management system, as described herein. The communication enables the needs of battery cells (e.g., cell balancing) and battery maintenance may be controlled in response to operations performed by a combination of both the battery management system and the remote communication device. For example, operations associated with cell balancing, determining a charging input, stopping application of the charging input, may be performed by the controller 710 and communicated by the remote communication system 700 to the battery management system.

The LEDs 760 may be coupled to resistors 762, 764 to enable the LEDs 760 to selectively turn on and off in response to signals received from the controller 710. One or more of the LEDs 760 may be used as a warning signal to a user. For example, if a user switches off the motorcycle, the battery management system transmit data to the remote communication device 700 indicating that the battery is low. The controller 710 may receive the data and in response to the data, the controller 710 may activate one or more of the LEDs 760. In an embodiment, the one or more LEDs 760 includes a red LED to indicate a warning. Once the battery has returned to a state that will allow electric start, the remote communication system 700 may activate another LED to indicate to a user that the battery is now ready (i.e., the battery is sufficiently charged) to enable starting of the motor. In this case, the LED could be green. Other indicators and signals may also be used.

Performing Battery Management Based on Operation Profiles

Referring to FIGS. 8-11, flow charts illustrating embodiments of the systems and methods disclosed herein working in harmony to manage the charge and power output of a vehicle system such as a motorcycle are depicted. The operations described in FIGS. 8-11 may be performed by any combination of node controllers and/or controllers of a remote communication device. For example, referring to FIG. 1, one or both of the node controllers 112, 114 may perform portions of the methods described herein. Further, portions of the methods described herein may be performed at a controller of a remote communication device, such as the remote communication device 550 and/or the remote communication device 700.

The methods described herein may be performed based on inputs and data accessible to the battery management system. For example, the battery management system may assess a vehicle battery state after measuring an internal battery temperature, ambient temperatures, a terminal voltage, cell voltages, and a terminal current (from a charging input or from a discharge output). Based on the vehicle battery state, the battery management system may then select an operating profile (a set of operations) to be performed. Various embodiments of selecting operating profiles are further described herein.

The operating profiles described in FIGS. 8-11 may correspond to sets of operations to be performed by a battery management system. Listings of operations corresponding to each operating profile may be non-exhaustive. For example, additional operations may be performed by the battery management system while operating according to any particular operating profile and multiple operating profiles may be performed concurrently.

Figure 8:
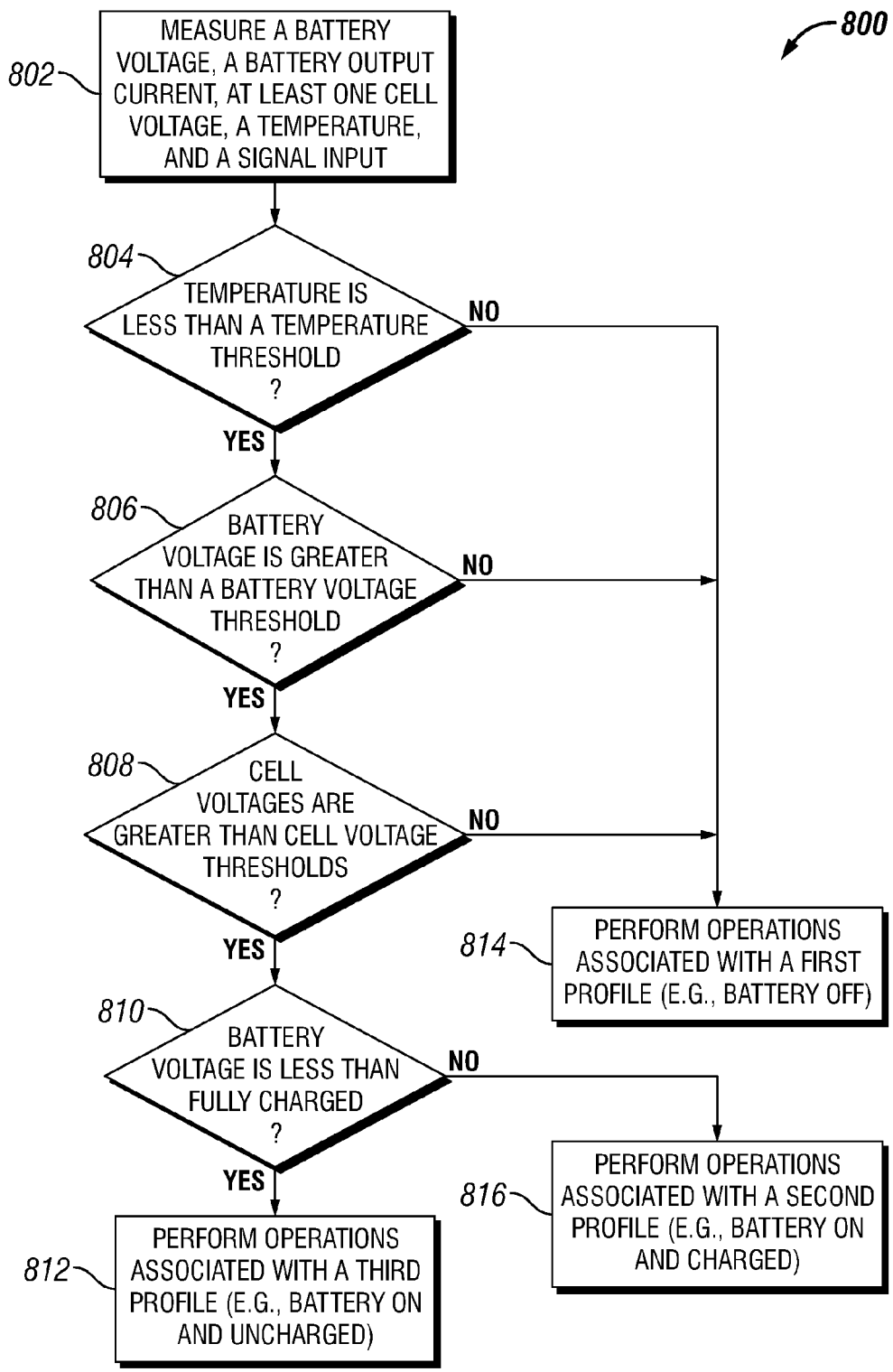
FIG. 8 is a flow chart illustrating an embodiment of a method of performing battery management at a battery management system.

Referring to FIG. 8, a flow chart illustrating an embodiment of a method 800 of performing battery management at a battery management system is depicted. The method 800 may be performed by the battery management system 100, the battery management system 200, the battery management system 300, the battery management system 400, the battery management system 500, and/or the battery management system 600, as described herein.

The method 800 may include measuring a battery voltage, a battery output current, at least one cell voltage, a temperature, and a signal input, at 802. For example, referring to FIG. 1, one or both of the node controllers 112, 114 may measure a battery voltage between the positive terminal 182 and the negative terminal 184 using the voltage/current detection subsystems 126, 136. Further a battery output current may be measured by at least one of the voltage/current detection subsystems 126, 136 and an indication of the measurement may be sent to one of the node controllers 112, 114. The node controllers 112, 114 may also initiate measurement of voltages of individual cells. For example, the node controller 112 may be configured to measure a voltage of the cell 151 and of the cell 152 via the voltage/current detection subsystem 126. The node controller 114 may be configured to measure a voltage of the cell 153 and of the cell 154 via the voltage/current detection subsystem 136. The node controllers 112, 114 may communicate measurements as needed via the node communication system 116. The temperature may be measured by at least one of the node controllers 112, 114 via at least one of the temperature detection subsystems 122, 132. The signal input may be received via one or more of the external communication subsystems 128, 138, as described herein. The signal input may include additional data or instructions received from a remote communication device.

Although FIG. 8 depicts a limited number of inputs, in other embodiments, the battery management system could be configured with additional input sensors to determine a current state of a system voltage, a battery charge rate or discharge rate, and temperature. Further, a determination of the voltage level of the battery may be modified or revised based on the temperature and a prior history of voltage levels. The battery management system may additionally derive information about the environment of the battery over time with a historical analysis of the input to the battery. The battery management system may further examine the current state and historical behavior and determine variables such as storage capacity of the battery, a vehicle running state, a starter cranking current over a range of temperatures, and use modes including typical discharging rates and typical charging rates. The battery management system may further determine the capabilities of a charging device connected externally. Each of these variables may be further used to determine an operating profile to be applied by the battery management system.

The method 800 may further include determining whether a temperature is less than a temperature threshold, at 804. For example, one or more of the node controllers 112, 114 may store the temperature threshold. In an embodiment, the temperature threshold indicates a temperature at which the cells 151-154 may be safely operated. Exceeding the temperature threshold for an extended duration may cause damage to the cells 151-154.

If the temperature is not less than the temperature threshold, then the method may include operations associated with a first profile, at 814. The first profile, in this case, may be associated with turning the battery off. Operations associated with the first operating profile may include one or more of blocking an output discharge of the battery, absorbing a current spike, and communicating with a remote communication device, as described herein.

If the temperature is less than the temperature threshold, then the method 800 may include determining whether battery voltage is greater than a battery voltage threshold, at 806. For example, one or more of the nodes 112, 114 may determine if a voltage difference between the terminals 182, 184 is below a threshold. In an embodiment, the threshold indicates a point at which the battery should no longer be discharged to prevent damage to the cells 151-154. For example, as shown in table 1, the threshold may be approximately 12.6 volts for a lithium iron phosphate type battery. If the battery voltage is not greater than the battery voltage threshold, then the method 800 may include performing the operations associated with a first profile, at 814. For example, the battery may be turned off, as described herein.

If the battery voltage is greater than the battery voltage threshold, then the method 800 may include determining whether individual cell voltages are greater than cell voltage thresholds, at 808. One or more of the nodes 112, 114 may determine if any of the cells 151-154 has a voltage level that falls below a cell voltage threshold that indicates a point at which individual cells should no longer be discharged to avoid cell damage. If the individual cell voltages are not greater than the cell voltage thresholds, then the method 800 may include performing the operations associated with a first profile, at 814. The first profile may include operations to be performed when the battery is off. For example, the operations associated with the first profile may include one or more of inhibiting or blocking discharge of the cells 151-154, providing a low current output to a load, absorbing a current spike from a charging device, as described herein.

If the cell voltages are greater than the cell voltage thresholds, then the method 800 may include determining whether a battery voltage is less than fully charged, at 810. If the battery is fully charged, then the method 800 may include performing operations associated with a second profile, at 816. The second profile may include operations to be performed when the battery is on and charged. For example, operations corresponding to the second profile may include one or more of modifying a voltage difference and/or resistance between the terminals 182, 184 to indicate to a charging device to stop applying a charging current, enabling an output discharge at the battery, and performing cell balancing, as described herein.

If the battery is not fully charged, then the method 800 may include performing operations associated with a third profile, at 812. The third profile may include operations to be performed when the battery is on and uncharged. For example the operations corresponding to the third profile may include enabling an output discharge at the battery.

By applying the method 800 to a battery, a battery management system (e.g., the battery management system 100) may invoke a number of sophisticated modes of operation intended to deal with not only common problems associated with a battery, but also rarer conditions that are nonetheless important in maintaining a battery system. Further, the method 800 may be used to adapt a charging system to the needs of a chemistry of an installed battery when the installed battery would not otherwise be compatible with the charging system.

Figure 9:
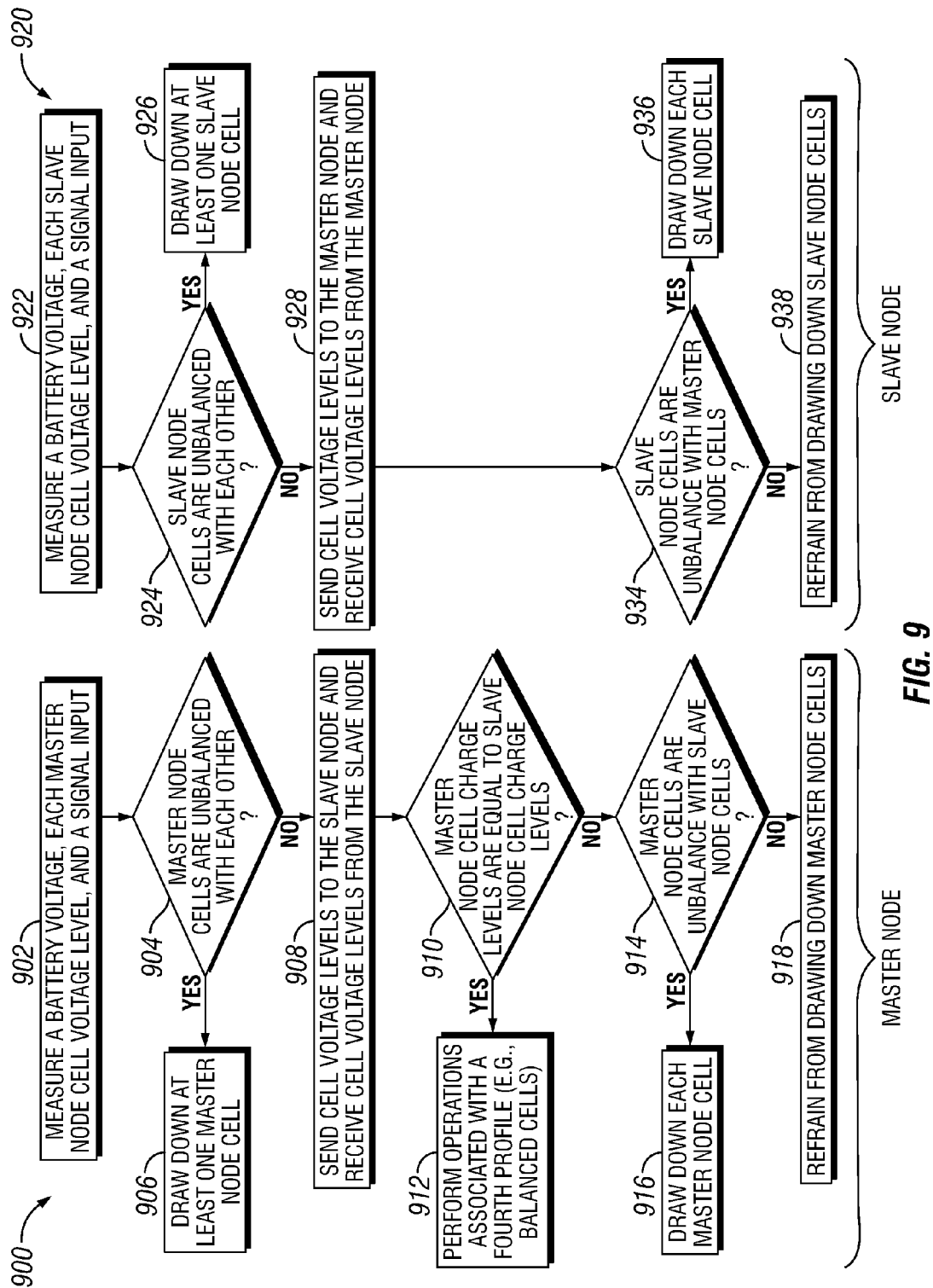
FIG. 9 is a flow chart illustrating methods of performing cell balancing at a master control node and a slave control node of a battery management system.

Referring to FIG. 9, a flow chart illustrating methods 900, 920 of performing cell balancing at a master control node and a slave control node of a battery management system are depicted. For example, performing cell balancing may include determining whether or not to partially discharge one or more cells attached to a node controller. The method 900 may be performed at a master node and the method 920 may be simultaneously performed at a slave node. In an embodiment, the master node corresponds to the node controller 114 and the slave node corresponds to the node controller 112 of FIG. 1. Alternatively, the master node may correspond to the node controller 112 and the slave node may correspond to the node controller 114.

The method 900 may include measuring, at a master node, a battery voltage, each master node cell voltage level, and a signal input, at 902. For example, the node controller 112 may measure a battery voltage between the positive terminal 182 and the negative terminal 184 using the voltage/current detection subsystem 126. The node controller 112 may also measure voltage levels of the cells 151, 152. Further, a signal may be received by the node controller 112 from a remote communication device, the signal indicating whether one or more of the cells 151-154 are unbalanced.

The method 920 may include measuring, at a slave node, a battery voltage, each slave node cell voltage level, and a signal input, at 922. For example, similar to the node controller 112, the node controller 114 may measure a battery voltage between the positive terminal 182 and the negative terminal 184 using the voltage/current detection subsystem 136. The node controller 114 may also measure voltage levels of the cells 153, 154. A signal may also be received by the node controller 114 from a remote communication device, the signal indicating whether one or more of the cells 151-154 are unbalanced. In an embodiment, the measurements performed at 922 may be performed concurrently with the operations performed at 902.

The method 900 may further include determining whether the master node cells are unbalanced with each other, at 904, and the method 920 may further include determining whether the slave nodes are unbalanced with each other, at 924. For example, the node controller 112 may determine whether the cells 151, 152 are unbalanced and the node controller 114 may determine whether the cells 153, 154 are unbalanced.

When the master node cells are unbalanced with each other, the method 900 may include drawing down at least one master node cell voltage level, at 906. For example, the node controller 112 may draw down a voltage level of at least one of the cells 151, 152. The cells 151, 152 may be drawn down as described with reference to FIG. 3.

Likewise, when the slave node cells are unbalanced with each other, the method 920 may include drawing down at least one slave node cell voltage level, at 926. For example, the node controller 114 may draw down a voltage level of at least one of the cells 153, 154.

When the master node cells are balanced with each other, the method 900 may include sending cell voltage levels from the master node to the slave node and receiving cell voltages levels from the slave node, at 908. Further, when the slave node cells are balanced with each other, the method 920 may include sending cell voltage levels from the slave node to the master node and receiving cell voltage levels from the master node, at 928. For example, the node controllers 112, 114 may communicate with each other via the node communication system 116.

The method 900 may also include determining whether master node cell charge levels are equal to slave node cell charge levels, at 910. For example, the node controller 112 (assuming the node controller 112 is associated with a master node) may determine whether each of the cells 151-154 are balanced.

When the master node cell charge levels are equal to the slave node cell charge levels, the method 900 may include performing operations associated with a fourth profile. In this case, the fourth profile may include operations to be performed when each of the cells of a battery are balanced. For example, the operations associated with the fourth profile may include one or more receiving a charging input from a charging system and refraining from performing further cell balancing.

The method 900 may further include determining whether master node cells are unbalanced with slave node cells, at 914. For example, the node controller 112 may determine whether the total voltage of the cells 151, 152 is unbalanced with the total voltage of the cells 153, 154.

If the master node cells are unbalanced with the slave node cells, the method 900 may include drawing down each master node cell, at 916. For example, the node controller 112 may draw down a voltage of each of the cells 151, 152 simultaneously, as described with reference to FIG. 3.

If the master node cells are balanced with the slave node cells, the method 900 may include refraining from drawing down master node cells, at 918. For example, the node controller 112 may refrain from drawing down the cells 151, 152 while the node controller 114 may be drawing down one or each of the cells 153, 154.

The method 920 may include determining whether slave node cells are unbalanced with master node cells, at 934. For example, the node controller 114 may determine whether a total voltage of the cells 153, 154 is unbalanced with a total voltage of the cells 151, 152.

If the slave node cells are unbalanced with the master node cells, the method 900 may include drawing down each slave node cell, at 936. For example, the node controller 114 may draw down a voltage of each of the cells 153, 154 simultaneously, as described herein.

If the slave node cells are balanced with the slave node cells, the method 900 may include refraining from drawing down the slave node cells, at 938. For example, the node controller 114 may refrain from drawing down the cells 153, 154 while the node controller 112 may be drawing down one or each of the cells 151, 152.

Figure 10:
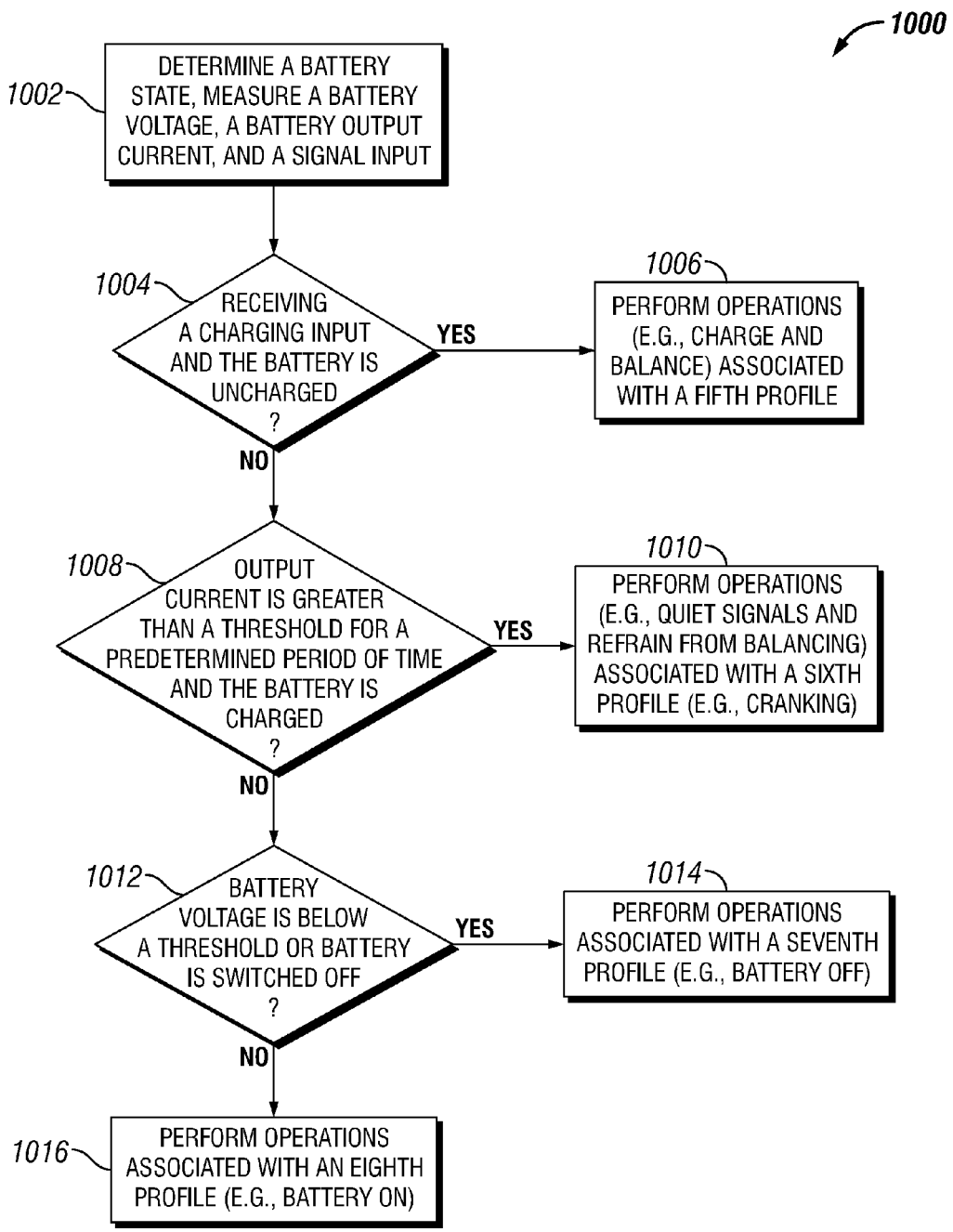
FIG. 10 is a flow chart illustrating a method of performing battery management based on a vehicle run state at a battery management system.

Referring to FIG. 10, a flow chart illustrating a method 1000 of performing battery management based on a vehicle run state at a battery management system (e.g. the battery management system 100) is depicted. For example, the method 1000 may be used to make a determination of a vehicle run state and to select an operating profile based on the vehicle run state.

The method 1000 may include determining a battery state and measuring a battery voltage, a battery output current, and a signal input, at 1002. For example, referring to FIG. 1, one or both of the node controllers 112, 114 may measure a battery voltage between the positive terminal 182 and the negative terminal 184 using the voltage/current detection subsystems 126, 136. Further a battery output current may be measured by at least one of the voltage/current detection subsystems 126, 136 and an indication of the measurement may be sent to one of the node controllers 112, 114. The signal input may be received via one or more of the external communication subsystems 128, 138, as described herein. The signal input may include additional data or instructions received from a remote communication device. The battery state may be determined based on any of the above mentioned voltages and/or currents, on the signal input, on additional information received by a node controller of the battery management system, or on a combination thereof.

The method 1000 may further include determining whether the battery is receiving a charging input and whether the battery is uncharged, at 1004. For example, at least one of the node controllers 112, 114 may make the determination based on the battery state, the battery voltage, the battery output, and/or the battery signal input.

When the battery is receiving a charging input and the battery is uncharged, the method 1000 may include performing operations associated with a fifth profile, 1006. The fifth profile, may be associated with charging the battery and performing cell balancing. For example, operations associated with the fifth operating profile may include one or more of receiving a charging input at the battery and performing cell balancing at the battery, as described herein.

When the battery is not receiving a charging input, the method 1000 may include determining whether an output current of the battery is greater than a threshold for a predetermined period of time and whether the battery is charged, at 1008.

When the output current is greater than a threshold for a predetermined period of time and the batter is charged, the method 1000 may include performing operations associated with a sixth profile, at 1010. For example, the sixth profile may be associated with an engine that is cranking, and thereby drawing significant amounts of current from the battery. Operations associated with the sixth profile may include quieting signals from the battery and refrain from performing cell balancing. For example, to conserve power or reduce strain on the cells, at least one of the node controllers 112, 114 may refrain from communicating via the external communication subsystems 128, 138 and may refrain from performing cell balancing via the cell balancing subsystems 124, 134 while the engine is cranking.

When the output current is not greater than a threshold for a predetermined period of time or the battery is not charged, the method 1000 may include determining whether the battery voltage is below a threshold or whether the battery is switched off, at 1012. When the battery voltage is below a threshold or the battery is switched off, the method 1000 may include performing operations associated with a seventh profile, at 1014. The seventh profile may be associated with the battery being switched off. For example, the operations associated with the seventh profile may include one or more of inhibiting or blocking discharge of the cells 151-154, providing a low current output to a load, and absorbing a current spike from a charging device, as described herein When the battery voltage is not below a threshold and the battery is not switched off, the method 1000 may include performing operations associated with an eighth profile, at 1016. The eighth profile may be associated with the battery being switched on. For example, operations corresponding to the eighth profile may include enabling an output discharge at the battery and performing cell balancing, as described herein.

Figure 11:
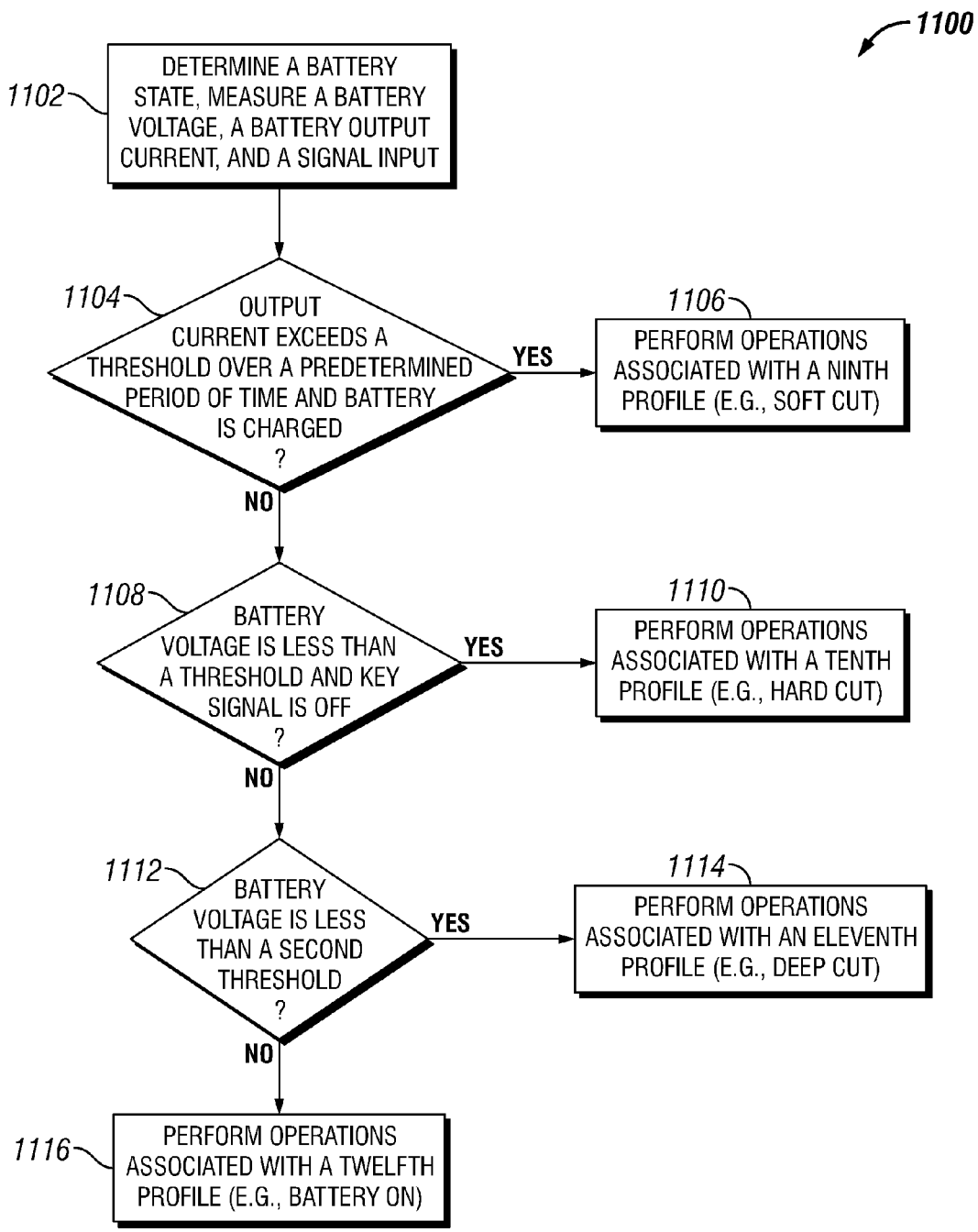
FIG. 11 is a flow diagram illustrating a method of selecting an output state at a battery management system.

Referring to FIG. 11, a flow diagram illustrating a method 1100 of determining voltage output at a battery management system is depicted.

The method 1100 may include determining a battery state and measuring a battery voltage, a battery output current, and a signal input, at 1102. For example, referring to FIG. 1, one or both of the node controllers 112, 114 may measure a battery voltage between the positive terminal 182 and the negative terminal 184 using the voltage/current detection subsystems 126, 136. Further a battery output current may be measured by at least one of the voltage/current detection subsystems 126, 136 and an indication of the measurement may be sent to one of the node controllers 112, 114. The signal input may be received via one or more of the external communication subsystems 128, 138, as described herein. The signal input may include additional data or instructions received from a remote communication device. The battery state may be determined based on any of the above mentioned voltages and/or currents, on the signal input, on additional information received by a node controller of the battery management system, or on a combination thereof.

The method 1100 may further include determining whether an output current exceeds a threshold over a predetermined period of time and whether the battery is charged, at 1104. For example, referring to FIG. 1, one or both of the node controllers 112, 114 initiate measurement of an output current between the terminals 182, 184 via the voltage/current detections subsystems 126, 136. Measurements may be taken over a period of time. One or both of the node controllers 112, 114 may determine whether an output current of the battery 110 exceeds the threshold over the predetermined period of time.

When the output current exceeds the threshold over the predetermined period of time and when the battery is charged, the method 1100 may include performing operations associated with a ninth profile. The ninth profile may correspond to a soft cut in the output of the battery. A soft cut may be used to preserve a high level of battery capacity in the presence of an extended period of low current discharge. For example, in cases where a vehicle is being stored, a soft cut may preserve as much battery charge as possible. In this operating profile the battery management system may cut off output to prevent small leakage current from draining the battery. Operations associated with a soft cut may include disabling an output of the battery. For example, referring to FIG. 1, one or both of the node controllers 112, 114 may disable or inhibit an output of the battery 110 using the output control circuit 170 as described herein. The operations may further include periodically enabling a low current output and determining whether a load (larger than a leakage amount) is detected. For example, one or both of the node controllers 112, 114 may control the output control circuit 170 to enable a low current output from the battery 110. One or both of the node controllers 112, 114 may receive an indication of a load present between the terminals 182, 184 via one or both of the voltage/current detection subsystems 124, 134, as described herein.

In an embodiment, a soft cut may be used in the case of an automobile with a 12 volt lead acid battery and a leakage current of less than 1 mA. For example, after an extended period of time the battery management system 100 may turn off output from the battery 110 and enable a low current output for 1 ms out of every second. The battery management system 100 may examine a load at the battery 110 to determine if an ignition key is in an on state (a "key-on" even is occurring). For example, if the ignition key is in the on state the vehicle power draw may increase to greater than 10 mA. Alternatively, one or both of the node controllers 112, 114 may receive a signal from a remote communication device (coupled to an ignition). If the node controllers 112, 114 determine that a key-on event has occurred, the battery management system 100 may enable the battery output such that the automobile can be started and operated normally. If no load is detected (no key-on event has occurred) the battery management system 100 may go back to "sleep" and wait for the next cycle (when the low current output is enabled at the battery 110) to test the load again. If the on-time (when the low current output is enabled at the battery 110) is 1 mS and if the sample rate is once per second, then the external leakage would be reduced up to $\frac{1}{1000}^{th}$ as compared to a battery that does not disable its output.

When the output current does not exceed the threshold over the predetermined period of time, the method 1100 may include determining whether the battery voltage is less than a threshold and whether a key signal is off, at 1108. For example, the threshold may be a threshold at which the battery charge level is sufficient to start a motor.

When the battery voltage is less than a threshold and the key signal is off, the method 1100 may include performing operations associated with a tenth profile, at 1110. The tenth profile may correspond to a hard cut in the output of the battery. A hard cut may be used to prevent driving the battery to imminent complete discharge. For example, the battery output could be switched off to preserve a low level of battery capacity deemed sufficient for several cranking cycles (to start a motor). To illustrate, a motorcycle or other vehicle may be parked and connected to a heavy electric load, such as an electric heater. In the presence of an extended discharge below a minimum voltage threshold, a hard cut to the output of the battery 110 may be engaged. In a particular embodiment, the hard cut may alternatively or additionally be initiated in response to a current exceeding a threshold for a predetermined period of time similarly to the soft cut.

During a hard cut, the battery management system 100 may be configured to periodically enable a low current output via the output control circuit 170 and determine whether a load is still present via one or more of the voltage/current detection subsystems 126, 136. If the load has been removed, the battery management system 100 may enable a low current output and monitor for a key-on event. The low current output at the battery 110 may be enabled for a predefined or computed range of time before the battery management system re-disablesing or re-inhibiting the output of the battery 110. This may enable the remaining charge to be preserved for restarting the vehicle. If after a key-on event a charging device is not detected or if discharge current exceeds a predetermined or a computed threshold, the battery management system 100 may reapply the hard cut in the battery output.

A benefit of initiating a hard cut in the battery output is that it may enable intelligent charging devices to detect the presence of a battery even when output of the battery may be inhibited or disabled. Many charging devices protected against short circuits between output terminals by refusing to turn on (i.e., apply a charging input to the battery 110) unless a minimum voltage is detected. Because the battery management system 100 may periodically enable a voltage output, the charging device may detect the voltage and begin charging the battery 110.

When the battery voltage is greater than or equal to the threshold or the key signal is on, then the method 1100 may include determining whether the battery voltage is less than a second threshold, at 1112. For example, the second threshold may be a critical threshold at which the cells 151-154 may become damaged.

When the battery voltage is less than the second threshold, the method 1100 may include performing operations associated with a tenth profile, at 1114. The tenth profile may correspond to a deep cut in the output of the battery. A deep cut may be used to preserve a critically low level of battery capacity in order prevent damaging discharge current or voltages. In an embodiment, the battery output may be re-enabled after detection of a charging input. The battery management system may be configured to prevent or inhibit discharge from the battery 110 while the battery 110 is in a deep cut mode. In an embodiment, the battery management system may disable output from the battery 110 for progressively longer periods of time as a battery charge level deteriorates.

When the battery voltage is greater than or equal to the second threshold, the method 110 may include performing operations associated with a twelfth profile, at 1116. The twelfth profile may correspond to the battery being in an on state. For example, during the on state, the battery 110 may enable an discharging output from the cells 151-154.

Although FIG. 11 depicts three types of cuts in the output of the battery, other embodiments may include more or fewer than three types of cuts. For example, other operating profiles may be employed by the battery management system to perform combinations of the operations described herein. For instance it is possible to configure the system such that there are not distinct operating profiles and instead the system behavior may change progressively. To illustrate, the battery output could be turned off for having long duration of a load that never changes implying that a device has been left connected and forgotten. The battery management system may turn off battery output and turn on the low current output to sense connection of a charger or a key-on event and as the battery level continues to deteriorate the system could progressively enable the sense output less often such that it might test the output once a second when the capacity of the battery is fairly high but progressively turn on the low current output as seldom as once a minute or even less.

Figure 13:
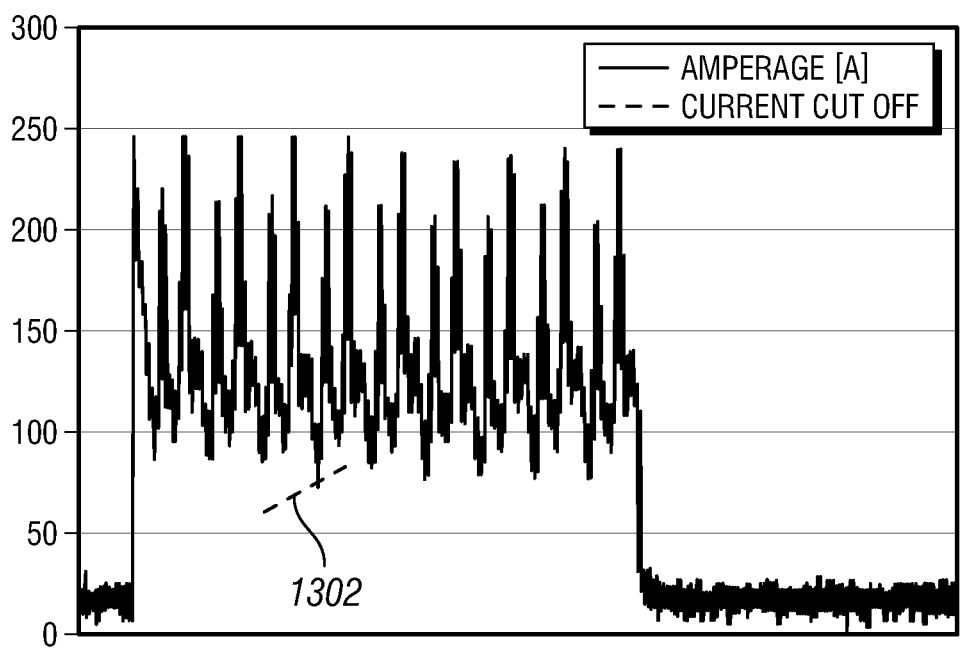
FIG. 13 is a graph illustrating commutation current as measured in a typical configuration for a motorcycle starter motor during a starting process While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

Referring to FIG. 13, a graph 1300 illustrating commutation current as measured in a typical configuration for a motorcycle starter motor during a starting process. The data of FIG. 13 was collected by sampling a current received by a DC motor starter of a Honda XBR 500 motorcycle. As can be seen in FIG. 13, current received by the starting motor may range cyclically from a high of 246 amps to a low of 72 amps during engine start.

A typical DC starter motor may comprise field windings or permanent magnets and an armature of a number of inductive phases coupled to a power supply (e.g., the battery 110) through brushes where rotation of the armature commutates power to subsequent phases in order to magnetically advance and revolve the motor. With each commutation of the DC motor armature applied power is redirected from one inductive phase to the next. When newly engaging the next coil phase the power supply to the motor sees an initial low current which peaks as the windings saturate until the motor revolves and engages commutation to the next phase when power is physically removed from the last phase.

The resulting current to the motor changes significantly from a start to a finish of each phase. The battery management system 100, as described herein may evaluate the range of current demand to the motor and may shut off an output of the battery 110 at a low point of current flow if conditions warrant shutting off the battery output. For example, the battery management system 100 may evaluate an output current to determine a range of current demand and to determine a time of low current demand and disable the output current at the time of low current demand.

A method of finding the low current point may include starting with a low current trigger point and slowly raising the current trigger point it until it encounters a match from a measured current. The dashed line 1302 demonstrates the increasing shut off threshold intersecting with a low current moment.

The starter motor may be the largest load in a vehicle system and may be primarily an inductive load. The energy stored in an inductor is computed as:

$$E = \frac{1}{2}LI^2 \qquad \text{Equation 4}$$

Where L is the inductance of the inductor and I is the current through the conductor. Because the inductive energy available for kick-back increases with the square of current it is valuable to be able to turn off power to the starter at a low instantaneous current. In the case of the Honda XBR 500 motorcycle current to the starter ranged from 72 amps to 246 amps over each commutation cycle averaging about 150 amps. A cut off threshold set at 72 amps would be less than half the average current flow and therefore one fourth the energy available for inductive kick back upon shut off.

Although various embodiments have been shown and described, the present disclosure is not so limited and will be understood to include all such modifications and variations are would be apparent to one skilled in the art.

What is claimed is:

1. A battery management system comprising:
   a plurality of cells coupled in series between a positive terminal and a negative terminal;
   a first node controller electrically coupled to a first set of node subsystems, the first node controller powered by a first cell or set of cells of the plurality of cells; and
   a second node controller electrically coupled to a second set of node subsystems, the second node controller powered by a second cell or set of cells of the plurality of cells, wherein the second set of cells differs from the first set of cells;
   an output control circuit positioned in series with the one or more cells between the positive terminal and the negative terminal, the output control circuit further coupled to the first node controller, the second node controller, or both;
   wherein the output control circuit comprises a transistor positioned in series with the one or more cells, wherein a control input of the transistor is coupled to the first control node or to the second control node;
   wherein the first node controller or the second node controller is configured to:
   selectively apply a signal to the control input to enable the transistor when the plurality of cells are not charging; and
   selectively refrain from applying the signal to the control input when the plurality of cells are charging.

2. The system of claim 1, further comprising a first set of node subsystems communicatively coupled to the first node controller and a second set of node subsystems communicatively coupled to the second node controller.

3. The system of claim 2, wherein the first set of node subsystems comprises a first cell balancing subsystem and wherein the second set of node subsystems comprises a second cell balancing subsystem.

4. The system of claim 3, wherein the first set of cells comprises a first cell and a second cell, wherein the first cell balancing subsystem comprises:
   a first resistor, a first terminal of the first resistor coupled to a first output of the first node controller and a second terminal of the first resistor coupled to a positive terminal of the second cell and to a negative terminal of the first cell; and
   a second resistor, a first terminal of the second resistor coupled to a second output of the first node controller, and a second terminal of the second resistor coupled to a negative terminal of the second cell.

5. The system of claim 4, wherein the first node controller is configured to:
   selectively couple a positive terminal of the first cell or the negative terminal of the second cell to the negative terminal of the first cell and the positive terminal of the second cell via the first resistor; and
   selectively couple the positive terminal of the first cell to the negative terminal of the second cell via the second resistor.

6. The system of claim 3, wherein the second set of cells comprises a first cell and a second cell, wherein the second cell balancing subsystem comprises:
   a first resistor, a first terminal of the first resistor coupled to a first output of the first node controller and a second terminal of the first resistor coupled to a positive terminal of the second cell and to a negative terminal of the first cell; and
   a second resistor, a first terminal of the second resistor coupled to a second output of the first node controller, and a second terminal of the second resistor coupled to a negative terminal of the second cell.

7. The system of claim 1, wherein a voltage difference between the first terminal and the second terminal includes a diode voltage due to an intrinsic body diode of the transistor or a parallel diode when the transistor is enabled, and wherein the voltage difference between the first terminal and the second terminal does not include the diode voltage when the transistor is disabled.

8. The system of claim 1, wherein a voltage difference between the first terminal and the second terminal corresponds to a charging profile of a first type of battery when the transistor is enabled and to a charging profile of a second type of battery when the transistor is disabled.

9. The system of claim 8, wherein the first type of battery is a lead acid type battery and wherein the second type of battery is a lithium iron phosphate type battery.

10. The system of claim 1, further comprising a node communication system communicatively coupling the first node controller to the second node controller.

* * * * *